US010061323B2

(12) United States Patent
Muck et al.

(10) Patent No.: US 10,061,323 B2
(45) Date of Patent: Aug. 28, 2018

(54) AUTONOMOUS APPARATUS AND SYSTEM FOR REPETITIVE TASKS IN CONSTRUCTION PROJECT

(71) Applicant: ADVANCED CONSTRUCTION ROBOTICS, INC., Wilmington, DE (US)

(72) Inventors: Stephen M. Muck, Butler, PA (US); Christopher C. Osterwood, Pittsburgh, PA (US); Michael J. Ramsay, Verona, PA (US); Duncan A. Campbell, Pittsburgh, PA (US); Richard E. Musgrave, Pittsburgh, PA (US); Christopher S. Shaw, Pittsburgh, PA (US); Woodrow E. Douglass, Seven Fields, PA (US); Stephen A. Diantonio, Pittsburgh, PA (US)

(73) Assignee: Advanced Construction Robotics, Inc., Wilmington, DE (US)

( * ) Notice: Subject to any disclaimer, the term of this patent is extended or adjusted under 35 U.S.C. 154(b) by 48 days.

(21) Appl. No.: 15/388,339

(22) Filed: Dec. 22, 2016

(65) Prior Publication Data

US 2018/0181134 A1    Jun. 28, 2018

(51) Int. Cl.
*E04F 21/00* (2006.01)
*G05D 1/02* (2006.01)
(Continued)

(52) U.S. Cl.
CPC ........... *G05D 1/0219* (2013.01); *E04F 21/00* (2013.01); *F16H 25/2204* (2013.01);
(Continued)

(58) Field of Classification Search
CPC ... E04F 21/00; F16H 25/2204; G05D 1/0219; G05D 1/0011; G05D 1/0088;
(Continued)

(56) References Cited

U.S. PATENT DOCUMENTS 3,069,654 A    12/1962 Hough
3,329,073 A    7/1967 Devereaux
(Continued)

FOREIGN PATENT DOCUMENTS

CN    204826674    6/2015
JP    2755332    9/1989
(Continued)

OTHER PUBLICATIONS

Richard O. Duda, et al., Use of the Hough Transformation to Detect Lines and Curves in Pictures, Stanford Research Institute, Menlo Park, CA, 1972, Assoc. For Computing Machinery, Inc., pp. 11-15.
(Continued)

*Primary Examiner* — Raymond W Addie
(74) *Attorney, Agent, or Firm* — Eckert Seamans Cherin & Mellott, LLC

(57) ABSTRACT

An autonomous assembly that includes a gantry subassembly, a carrier subassembly movably mounted on the gantry subassembly, a tool actuation subassembly mounted on the carrier subassembly, and an autonomous control system including a perception subsystem, a motion planning subsystem, and a motion control subsystem. The gantry subassembly includes a bridge member for laterally spanning a selected section of a work site and a gantry drive system for effecting travel of the gantry subassembly along a first path, generally in a longitudinally along the length of the selected portion of a work site. The carrier subassembly includes a carriage and a carriage drive system for effecting travel of the carriage along a second path, generally laterally along the bridge member. The tool actuation subassembly includes a motion actuator, an end-effector operatively connected to the motion actuator, and an actuator drive system for effecting linear travel of an end-effector along a third path, generally perpendicular to the second path.

31 Claims, 34 Drawing Sheets

(51) Int. Cl.
*G05D 1/00* (2006.01)
*F16H 25/22* (2006.01)

(52) U.S. Cl.
CPC ......... *G05D 1/0011* (2013.01); *G05D 1/0088* (2013.01); *G05D 1/0094* (2013.01); *G05D 1/0248* (2013.01); *G05D 1/0259* (2013.01); *G05D 1/0278* (2013.01); *G05D 2201/0202* (2013.01); *Y10S 901/01* (2013.01); *Y10S 901/41* (2013.01); *Y10S 901/47* (2013.01)

(58) Field of Classification Search
CPC .. G05D 1/0094; G05D 1/0259; G05D 1/0278; G05D 1/0248; G05D 2201/0202; Y10S 901/01; Y10S 901/41; Y10S 901/47
USPC ......................................................... 404/112
See application file for complete search history.

(56) References Cited

U.S. PATENT DOCUMENTS

| | | | |
|---|---|---|---|
| 3,477,351 A | | 11/1969 | Funk et al. |
| 5,195,204 A | * | 3/1993 | Muller .................. E01D 21/105 14/4 |
| 5,511,268 A | * | 4/1996 | Albus .................... E01D 21/06 14/77.1 |
| 5,944,064 A | | 8/1999 | Saito et al. |
| 5,960,502 A | * | 10/1999 | Sherman ................ E01D 21/06 14/77.1 |
| 6,100,517 A | | 8/2000 | Yahav et al. |
| 6,695,120 B1 | | 2/2004 | Trammell |
| 6,721,985 B2 | * | 4/2004 | McCrary ............... B60L 3/0046 14/77.1 |
| 7,423,734 B1 | | 9/2008 | Luik |
| 7,520,014 B2 | * | 4/2009 | Homsi .................. E01D 19/103 14/77.1 |
| 8,029,710 B2 | | 10/2011 | Khoshnevis |
| 8,671,490 B1 | * | 3/2014 | Carney ................. B66C 19/005 14/2.4 |
| 2009/0261230 A1 | | 10/2009 | Imhof |
| 2015/0266147 A1 | | 9/2015 | Reid et al. |
| 2016/0227193 A1 | | 8/2016 | Osterwood et al. |

FOREIGN PATENT DOCUMENTS

| | | |
|---|---|---|
| JP | 2558980 Y | 3/1991 |
| JP | 06023684 | 7/1992 |
| JP | 2005188064 | 12/2003 |
| WO | WO2008024049 A1 | 2/2008 |

OTHER PUBLICATIONS

D. H. Ballard, Generalizing the Hough Transform to Detect Arbitrary Shapes, Computer Science Department, Univ. of Rochester, Rochester, NY, 1980, pp. 111-122.

* cited by examiner

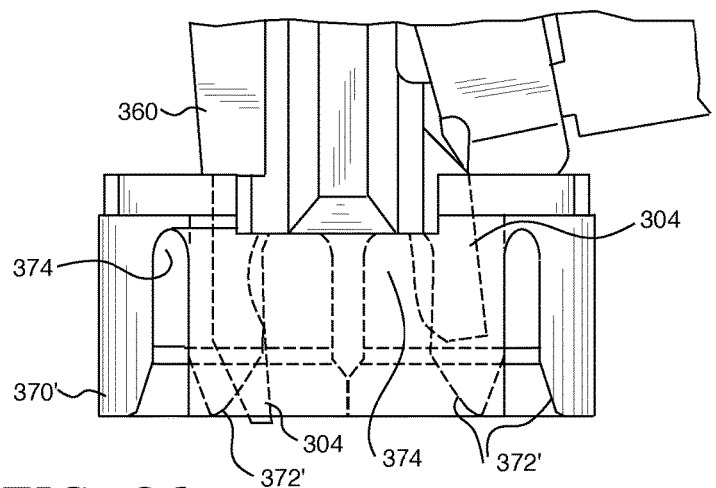
FIG. 36
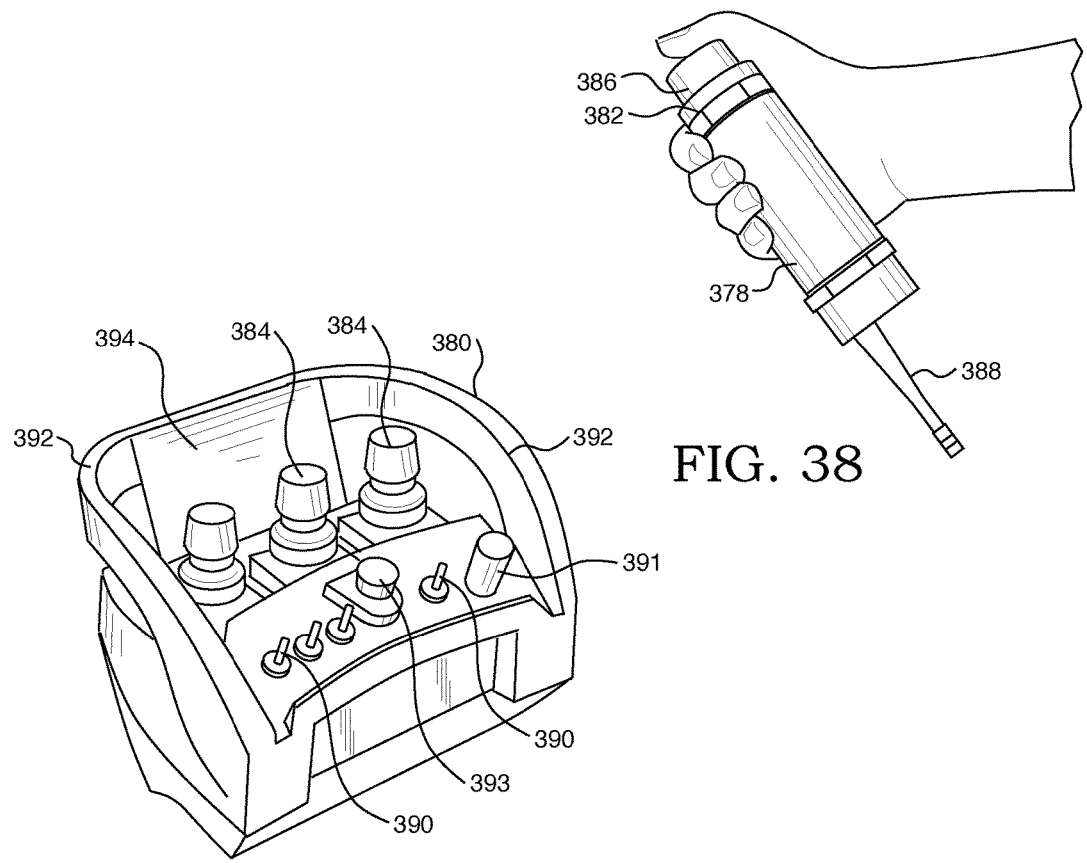
FIG. 38
FIG. 37

AUTONOMOUS APPARATUS AND SYSTEM FOR REPETITIVE TASKS IN CONSTRUCTION PROJECT

BACKGROUND OF THE INVENTION

1. Field of the Invention

The present invention relates to construction equipment, and more particularly to an adjustable autonomous assembly for carrying out repetitive functions over a large area.

2. Description of the Prior Art

Construction is a labor intensive undertaking. In particular, road, bridge, and other outdoor and indoor surface construction, such as forming concrete roadways, runways or floors, involves many repetitive actions, whether it is driving spikes or other fasteners at prescribed intervals, or joining intersecting rebar sections. Roads, for example, typically range from 35 feet to many hundreds of feet wide and miles in length. Bridge decks are typically not as long but often match the roadway in width. Bridges and roadways, especially on and off-ramps, curve. Concrete road and bridge surfaces require typically two layers of rebar in a grid pattern, with bar running along the length and width of the surface intersecting as they cross. The rebar grid adds structural and tensile integrity to the concrete structure. Each intersection of rebar has to be joined to fix the rebar in place to secure their position and prevent movement during concrete pour, compaction, settling, and smoothing operations. Typically, the intersections are joined with metal or plastic clips or with plastic coated metal ties wrapped around the crossed bars. A crew of workers either ties the rebar intersections manually with a spool of wire and a pair of pliers or with a powered rebar tying tool. Tool guns are commercially available for applying rebar ties or clips but still require construction workers to walk along the length and width of the rebar grid, and bend over at each intersection, one at a time, to activate the tool gun to apply the tie or clip at each intersection. Tying rebar along a wide road surface is repetitive, time consuming, and physically demanding work. Moreover, having several crew members walking on untied rebar while performing these tasks is unsafe, particularly when the work site is an elevated bride deck.

Efforts have been made in the past to automate rebar tying. In addition to the tool guns for tying rebar, attempts at larger scale rebar grid preparation have been proposed. For example, U.S. Pat. No. 3,477,351 discloses a rebar tying machine that raises the longitudinal bars and ties a transverse bar across the longitudinal bars. A laterally moving tying machine on a carrier ties the transverse bar sections to the longitudinal bars. Japanese patent application JP 2005188064 describes an automatic tying apparatus for tying rebar on a grid that requires machine components on the bottom and the top of the rebar intersection. The apparatus is designed for indoor use and moves laterally from rebar intersection to intersection.

Little in the way of improvements in automated rebar tying have been made in more than a decade. These and other repetitive construction tasks continue to require back breaking, substantially manual labor that can expose workers to unsafe conditions. There is a need for an improved method and system for performing repetitive physically demanding tasks, such as rebar tying.

SUMMARY OF THE INVENTION

The problem associated with repetitive, physically demanding tasks in, for example, roadway and bridge deck construction is addressed by the system and apparatus described herein.

An autonomous assembly is described herein that includes, generally, a gantry subassembly, a carrier subassembly movably mounted on the gantry subassembly, a tool actuation subassembly mounted on the carrier subassembly, and an autonomous control system. The gantry subassembly may comprise a bridge member for laterally spanning a selected section of a work site and a gantry drive system for effecting travel of the gantry subassembly along a first path. The carrier subassembly may comprise a carriage and a carriage drive system for effecting travel of the carriage along a second path along the bridge member. The tool actuation subassembly may comprise a motion actuator, an end-effector operatively connected to the motion actuator, and an actuator drive system for effecting linear travel of the end-effector along a third path generally perpendicular to the second path. The autonomous control system may comprise a perception subsystem, a motion planning subsystem, and a motion control subsystem.

The gantry drive system may generally include at least one gantry drive motor, and at least one gantry drive wheel operatively connected to the at least one gantry drive motor. The bridge member in various aspects has at least two legs, and in various aspects, two pairs of legs, wherein one leg or one pair of legs is attached at each of a first and second end of the bridge member. The bridge member may further include a pair of rails spaced from each other and defining the second path. The carriage may be mounted on the rails for travel along the second path.

The carriage drive system in various aspects may include a carriage drive motor and at least one pair of carriage drive wheels operatively connected to the carriage drive motor and configured for travel on the pair of bridge member rails. An axle connects the pair of carriage drive wheels to each other for coordinated motion along the bridge member rails. The carrier subassembly may also include a power source mounted on the carriage for powering the gantry drive motor and the carriage drive motor.

The tool actuation subassembly may, in various aspects, include at least one flexible support plate flexibly mounted to the carriage for supporting the motion actuator. The flexible plate enables the tool actuation subassembly to slide or tilt in at least two degrees of freedom relative to the carriage. The actuator drive system of the tool actuation subassembly may, in various aspects, include a drive assembly operatively connected to the power source for powering motion of the motion actuator. The drive assembly may include a drive motor. A frame may be mounted for linear motion to the motion actuator. A tool may, in various aspects be releasably mounted to the lower end of the frame. The tool has the end effector positioned thereon for performing a desired function at a point of interest in the work site.

At least one perception sensor may be mounted to the carriage and operatively connected to a computer mounted on the assembly. The at least one perception sensor may in various aspects, be positioned for taking and communicating images of the work site to the computer for processing by a perception software subsystem. In various aspects, the perception sensor may be any suitable three dimensional perception camera that utilizes stereo vision, laser scanning, laser time-of-flight, or any other mean of imaging a scene in three dimensions. The perception sensor may include, for example, a pair of stereo vision cameras.

In various aspects, the perception software subsystem may calculate from the images communicated by the perception sensor the location of positions of interest on the work site for use of the end-effector, and communicate the positions of interest to the motion planning subsystem, which in various aspects may calculate and communicate travel instructions comprised of the direction, extent and speed of travel of each of the gantry subassembly, carrier subassembly, and tool actuation subassembly on the first, second and third paths, respectively, to the motion control subsystem for effecting the calculated travel instructions by control of the gantry drive motor, the carriage drive motor and the tool actuation drive motor.

These and other features of exemplary embodiments of various aspects of the assembly are described in more detail herein.

BRIEF DESCRIPTION OF THE DRAWINGS

The characteristics and advantages of the present disclosure may be better understood by reference to the accompanying figures.

FIG. 23 A shows a cross-section of a ball screw system and FIG. 23 B is a section view taken through the line B-B of FIG. 23 A.

FIG. 36 is a partial transparent view of the alignment component of FIG. 34.

FIG. 37 shows an embodiment of a remote controller for use by an operator for the apparatus.

FIG. 38 shows an embodiment of an emergency stop remote controller for use by an operator for the apparatus.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated. "Operatively connected" as used herein means that two or more components or features may be directly or indirectly connected to each other or may be wirelessly connected, in each case such that the operation or actuation of one component or feature affects the operation or actuation of the operatively connected component or feature.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 1:
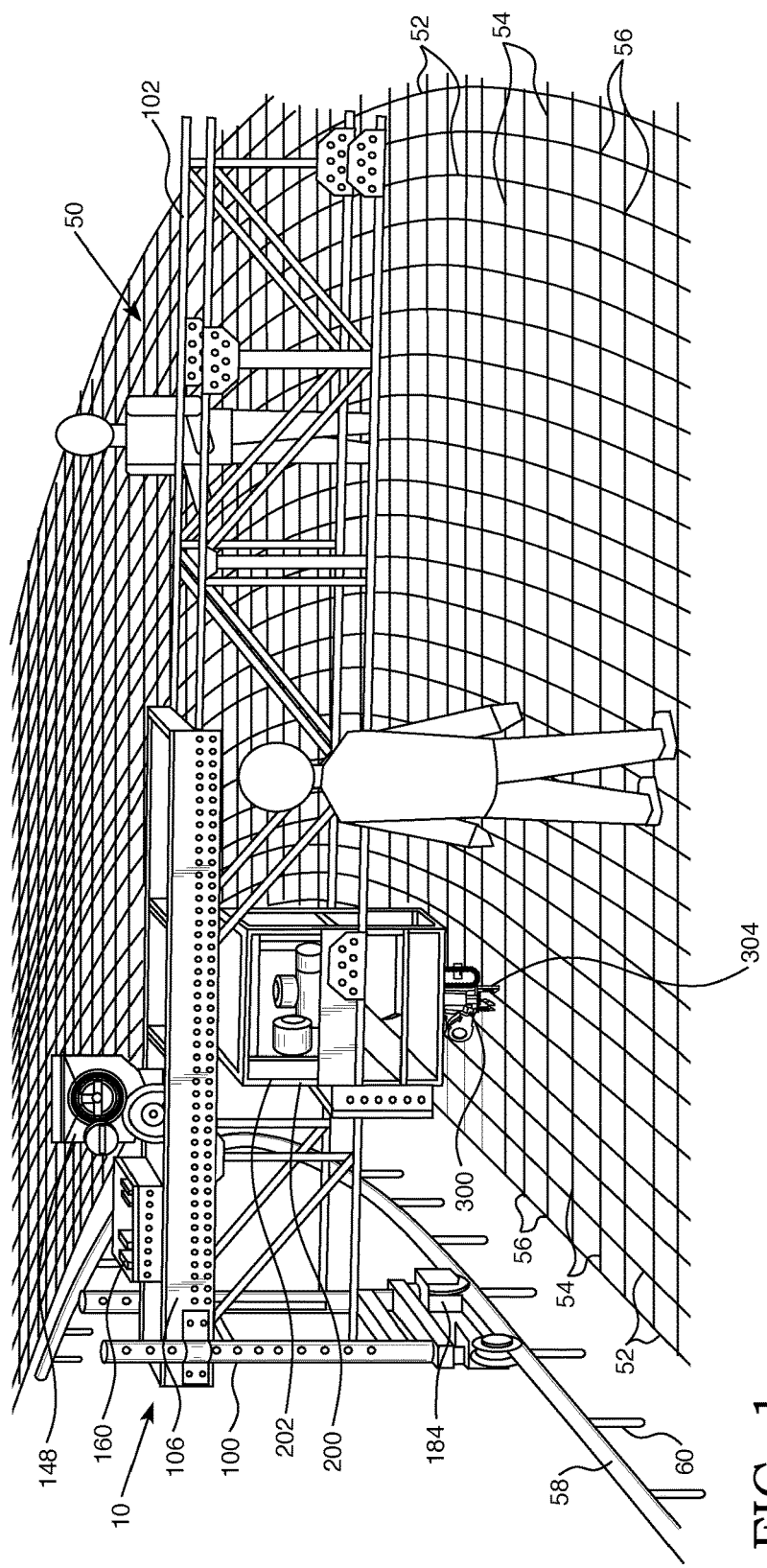
FIG. 1 is a partial perspective view of an embodiment of an autonomous apparatus in use at an exemplary non-linear construction site.
Figure 2:
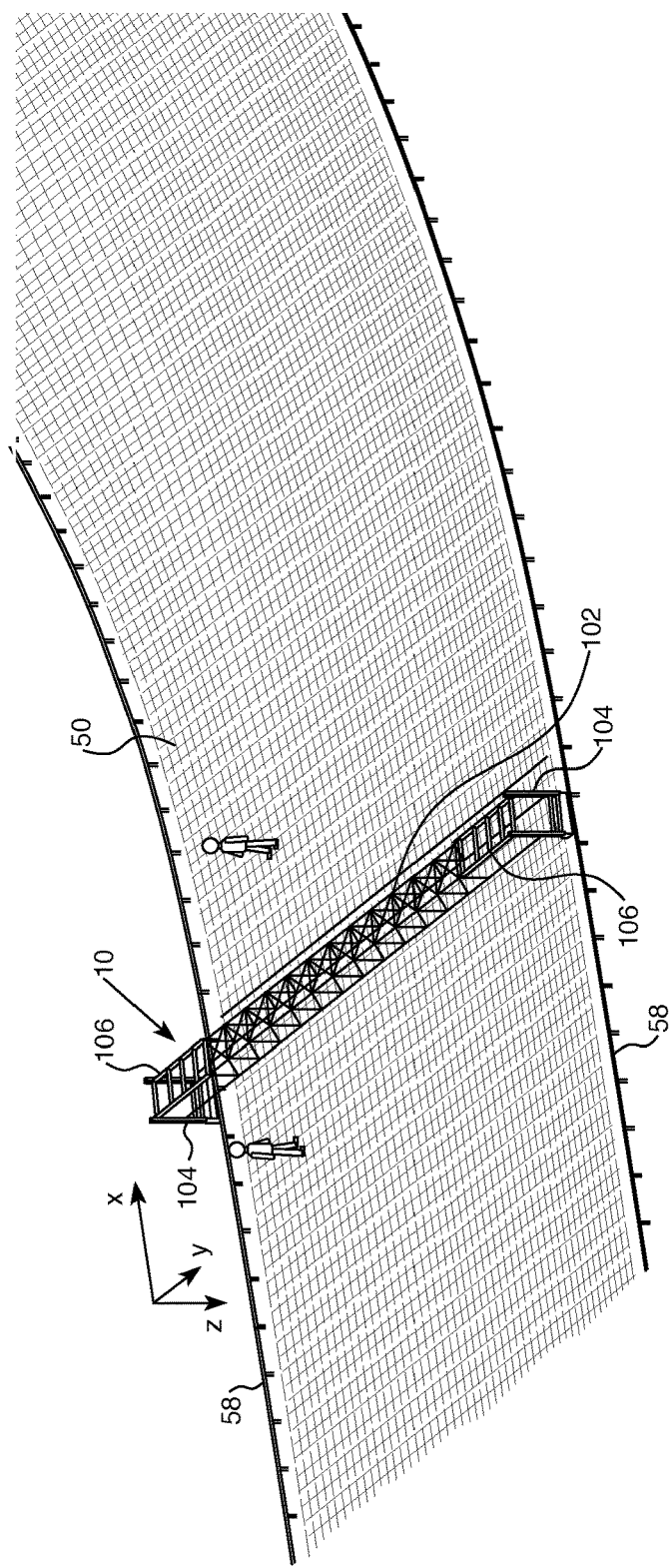
FIG. 2 is an aerial view of the autonomous apparatus of FIG. 1 at an exemplary non-linear construction site.

FIG. 1 illustrates a portion of an embodiment of the apparatus 10 in use at a work site, such as that shown in FIG. 2. The work site shown is a non-linear, curved roadway, which may be on the ground or may be an elevated bridge deck. Work sites may also be linear, sloped, uneven, non-linear, and/or have more gradual or sharper curves than the one shown in the figures. In each such case, a construction crew will have pre-positioned the screed rail 58, sections of longitudinal rebar 52 and lateral rebar 54 and will have tied a sufficient number of rebar intersections or joints 56 to fix the individual rebar mat 50 into the desired mat pattern. For example, about ten percent of the rebar intersections 56 may be manually tied or clipped by work crews with pliers or power tools, such as a tie gun, before installation and use of the robotic apparatus and system described herein. The longitudinal edges of each side of the work site are typically lined with screed rails 58 mounted on posts 60 in anticipation of laying and smoothing the concrete.

Figure 3:
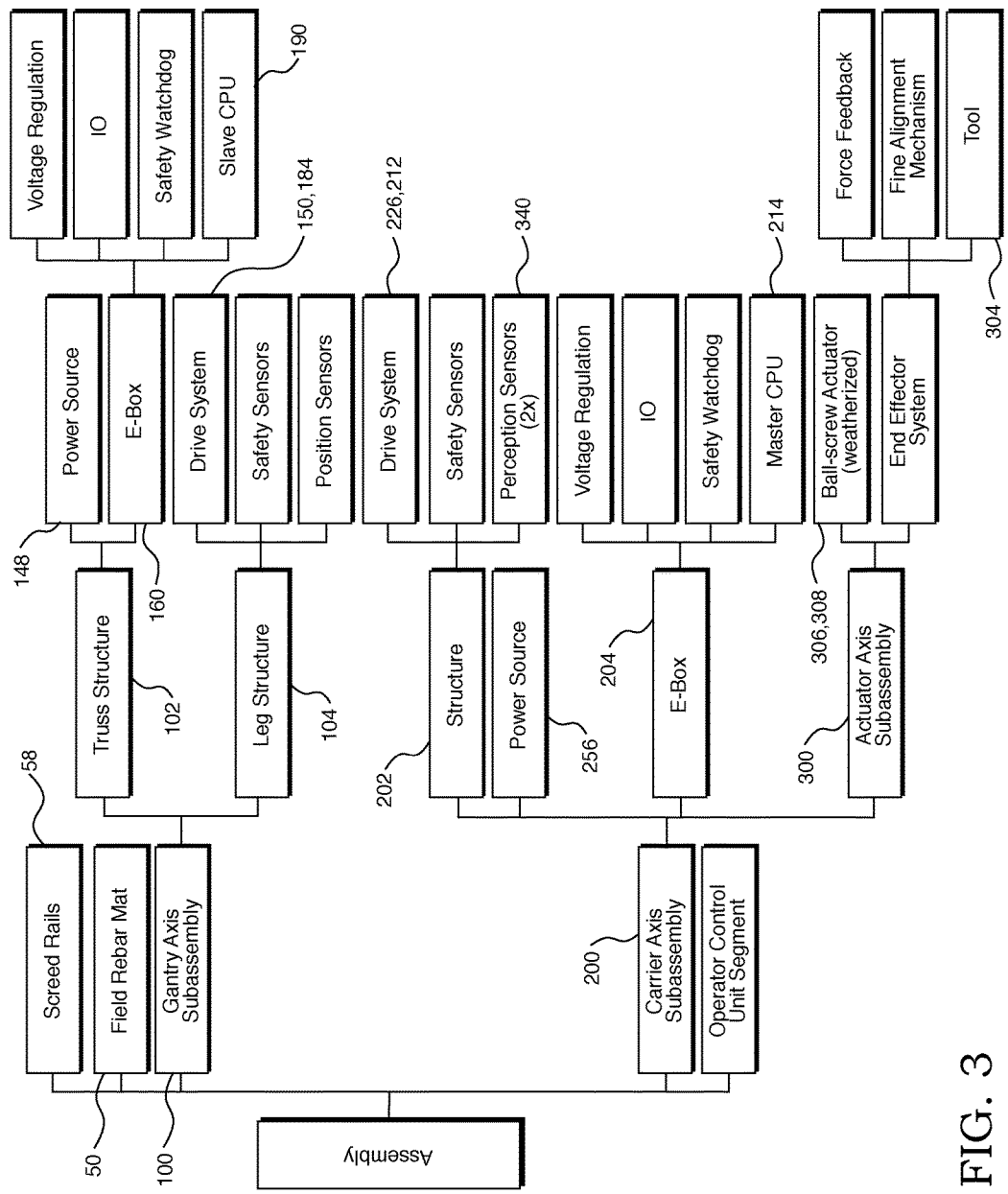
FIG. 3 is a diagram of the primary components of the assembly of the apparatus of FIG. 1.
Figure 4:
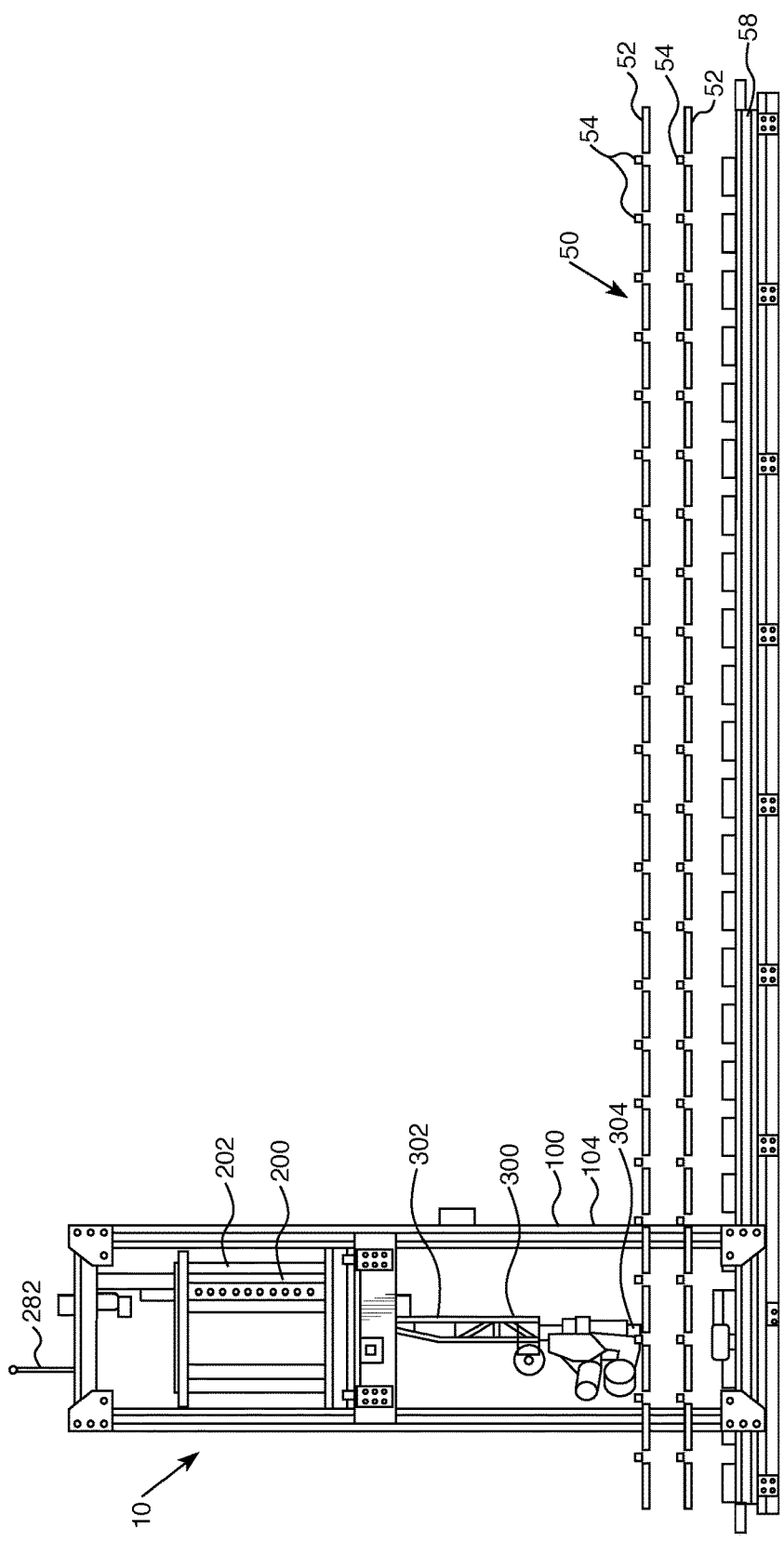
FIG. 4 is a schematic side elevation view of an embodiment of an autonomous apparatus.
Figure 5:
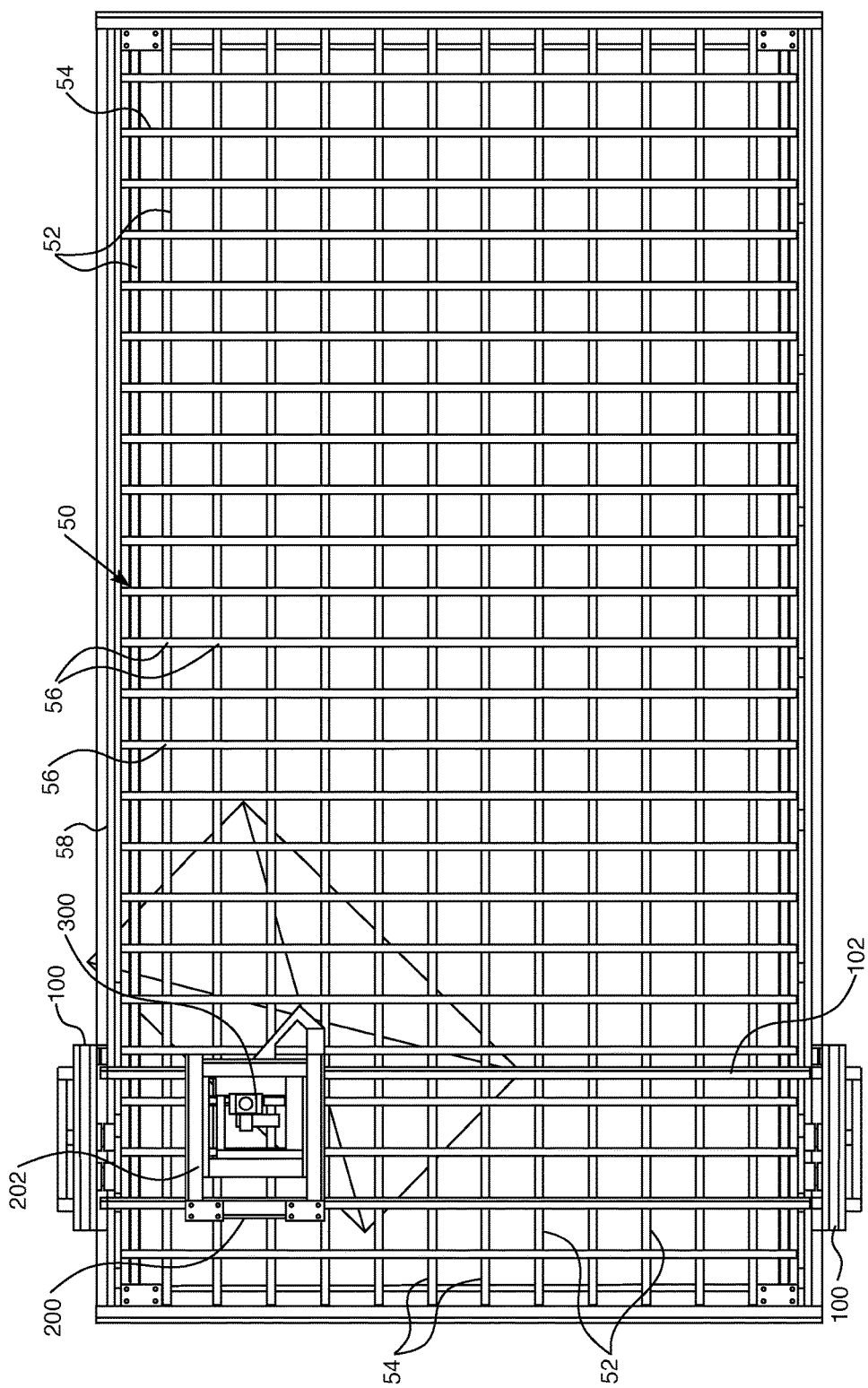
FIG. 5 is a schematic top plan view of the apparatus of FIG. 4 at an exemplary linear work site.

The general structural assembly of the components of the apparatus 10 are outlined in FIG. 3. As shown in FIGS. 4 and 5, the apparatus 10 described herein generally comprises at least three subassemblies that together provide motion in three primary directions: the gantry axis subassembly 100 effects motion along a longitudinal path of the work site; the carrier axis subassembly 200 effects motion in the lateral direction, generally transverse to the longitudinal path; and the tool actuator axis subassembly 300 effects motion in the vertical direction. For ease of reference, the paths of motion may be referred to, respectively, as motion through planes in the X-axis (gantry axis), planes in the Y-axis (carrier axis), and planes in the Z-axis (tool actuation axis). Those skilled in the art will appreciate that the "planes" and the paths of motion discussed herein, and in particular, the longitudinal or X-axis plane, will not typically be mathematically planar or linear because surfaces, whether on the ground or especially on a bridge deck, will not typically be precisely planar, straight, or even static. Both during construction and in use after construction, bridge decks, for example, vibrate and flex in response to the weight of vehicles and ground surfaces are uneven. Prior to pouring the concrete, the rebar mat 50 flexes as the work crew walks on it and may be intentionally sloped to accommodate planned grading of the roadway. Therefore, longitudinal path, as used herein refers to the path of the work site, such as a roadway, and is understood to include one or any combination of linear, non-linear, planar, non-planar, straight, curved and angular paths. The apparatus 10 addresses those variables with a unique perception system and software to recognize changes in the longitudinal path and variations in the rebar mat 50 indicative of obstacles, such as debris or other items to be avoided, and with subassemblies and subsystems to act in response to the perceived path changes and obstacles.

The gantry axis subassembly 100 is the prime mover and moves the apparatus 10 along a first path, which in various aspects, follows the longitudinal path of the roadway or bridge deck under construction. The gantry axis subassembly 100 is comprised of a truss structure 102 that in various aspects may be formed from modules 118 joined together to span the width of a work site, such as a road way or bridge deck (i.e. in a direction transverse to the first path). The gantry axis subassembly 100 may, in various aspects, be supported on conventional steel pipe screed rails 58 typically used in concrete road and bridge deck formation. In alternative embodiments, the gantry axis subassembly 100 may be structured with wheels for riding along the ground. The gantry axis subassembly 100 contains a power source, such as motor 148, to power the gantry axis components, a secondary electronics box 160 for system control, and a feedback controlled drive system, including drive motor 184 to self-propel longitudinally along the rails 58 or ground in either continuous or step-&-settle motions.

The carrier axis subassembly 200 comprises a carriage 202 that rides across the transverse span on the gantry axis 100 along a second path, which in various aspects is substantially perpendicular to the first path along which the gantry axis 100 travels, for example, along the plane of the Y-axis. Because the first longitudinal path along which the gantry travels will not always be straight, the second path, transverse to the first path will not always be at a 90° angle relative to the first path. The first path may curve, as shown in FIG. 2, and the second path will extend at an angle, e, from the first path.

The carrier axis subassembly 200 carries the tool actuator subassembly 300 along a third path generally perpendicular to the second path, for example, along the plane of a Z-axis. The carrier axis subassembly 300 contains a power source and a feedback controlled drive system 206 to self-propel along the transverse axis, the main system control electronics box 204, and perception sensors 340. The perception sensors 340 identify the specific sites for tool action. In aspects wherein the apparatus 10 and system are used for road construction, the perception sensors 340 identify, for example, the intersections 56 of rebar grids. In various aspects, the perception sensors 340 observe the rebar mat 50 to detect the rebar pattern in general (e.g. the orientation) to detect and locate rebar intersections 56, to detect irregularities in the rebar or grid mat pattern, and to detect already tied rebar intersections 56.

The tool actuator axis subassembly 300 is a structure that rides on the carrier axis subassembly 200. The tool actuator axis subassembly 300 contains a position and force feedback controlled drive system 320 to self-propel along a third path underneath the carrier 202 to engage the tool action site, such as a rebar mat 50. The tool actuator axis subassembly 300 carries the tool end-effector 304 and any interface mechanics relevant to the engaging the tool action site.

The tool end-effector 304 is carried on a frame 302 in the path of the tool actuator axis and self-aligns to the tool action site, which may, for example, be a rebar intersection 56. The end-effector 304 can be moved into position over the site of interest to act according to its intended function. In aspects wherein the tool end effector 304 is a rebar tying tool, the tool action would be to wrap and tie wire around the rebar intersection 56. Details of various aspects of each subassembly will now be described.

The Gantry Subassembly

The gantry axis subassembly 100 in various aspects, may include at least two, and preferably four legs 104, with at least one, and preferably two at each end, an adjustable support frame 106 on each end to which the legs 104 are mounted, and a bridge member, such as truss 102, that spans the width of the work site. The bridge member is attached at each end thereof to one of the support frames 106. The bridge member may be constructed from modules 118 so that the length of the bridge member may be extended on the job site to conform the lateral dimension of any given work site. Extension members may be provided so that the width of the bridge member may be increased as needed at the job site. Although not limited to the structural components described herein, the bridge member will be described as a truss 102, like that shown in FIGS. 6-8. Those skilled in the art will recognize that other structures that can bridge the span of a given work site and carry the carrier and tool actuation subsystem components may suffice.

Figure 9:
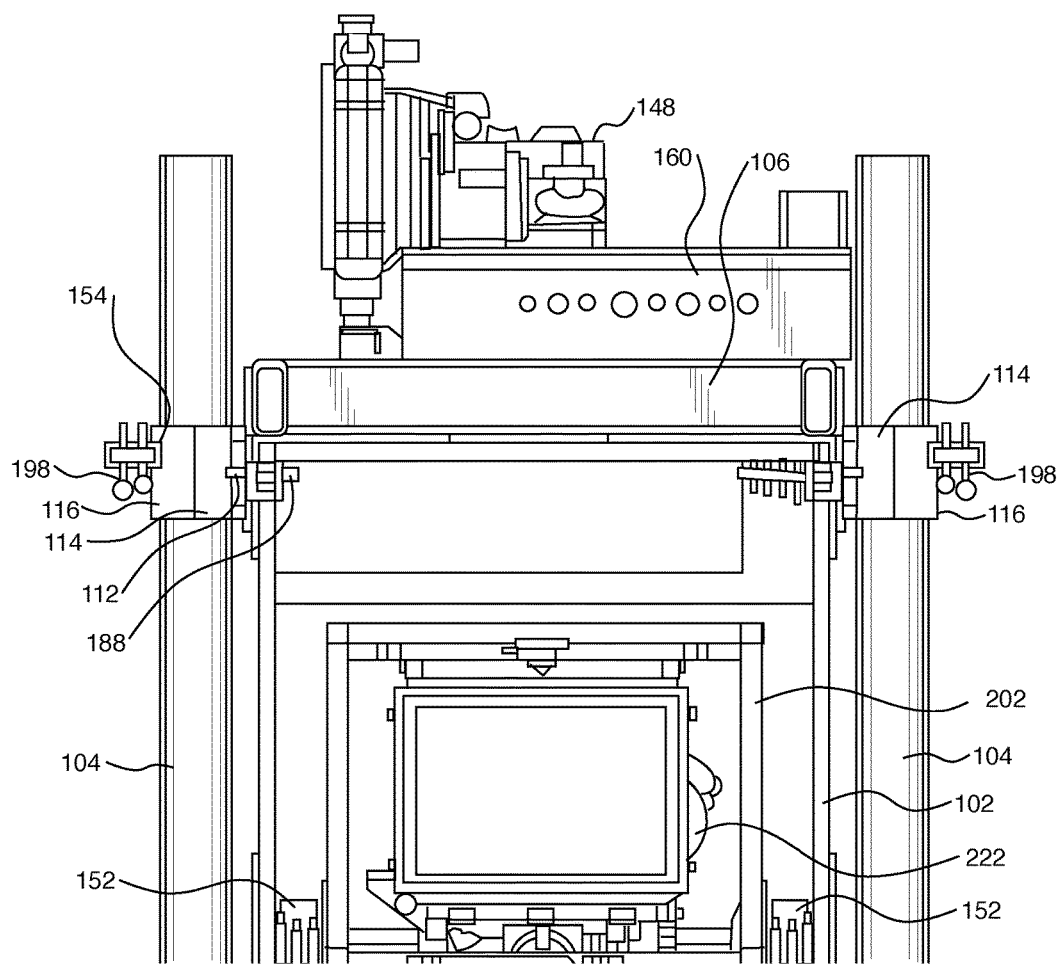
FIG. 9 is a partial end view of certain of the leg, support frame, and truss components of the gantry subassembly of the apparatus.
Figure 10:
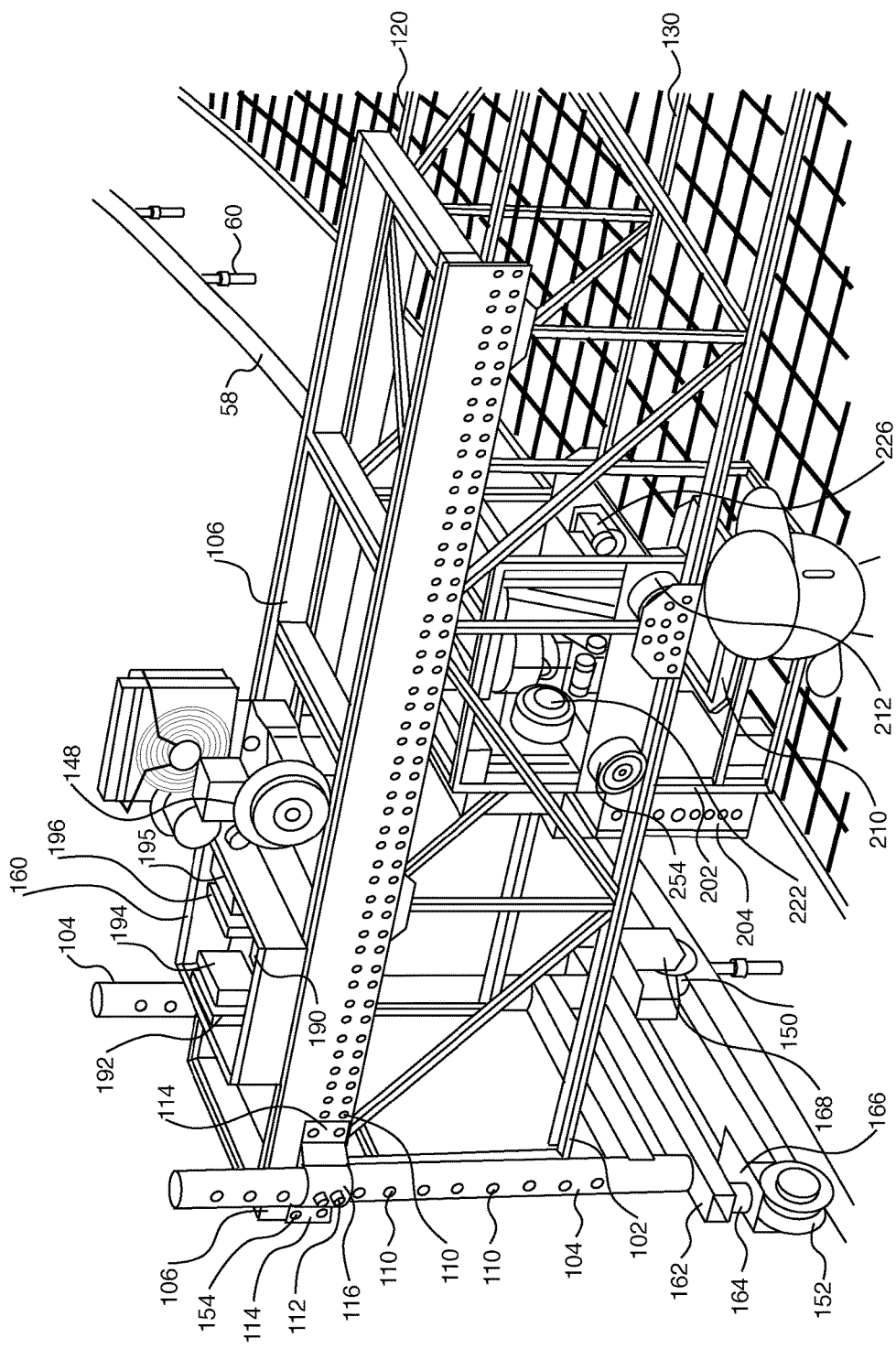
FIG. 10 is a partial side perspective view of the apparatus of FIG. 1.

FIGS. 1 and 10, for example, show the legs 104 of gantry axis subassembly 100 to include pre-drilled holes 110. As shown additionally in FIG. 9, brackets 108 and pins 112, or any other suitable connectors, connect support frame 106 at a desired elevation on legs 104 to permit the frame 106 and truss 102 to be raised or lowered to an elevation that suits the particular job site. Each bracket 108 has at least one frame connector portion 114 and a leg connector portion 116, each portion having pre-drilled holes 154 that align respectively with pre-drilled holes 110 in the frame 106 and legs 104. Pins 112 pass through the aligned holes to connect the frame 106 to the frame portion 114 of bracket 108 and the legs 104 to the leg portion 116 of bracket 108. Each of the legs 104 and the support frame 106 may have multiple holes 110 so that the frame 106 can be adjusted up or down (i.e., for example, on a plane of a Z-axis, or as shown, vertically) or forward or backward (i.e., for example, along a plane of a Y-axis, or as shown, horizontally in a lateral direction) on the legs 104. Additional locking fasteners 198, such as a screw and nut, as shown in FIG. 9, may be used to secure the frame 106 and legs 104.

Figure 6:
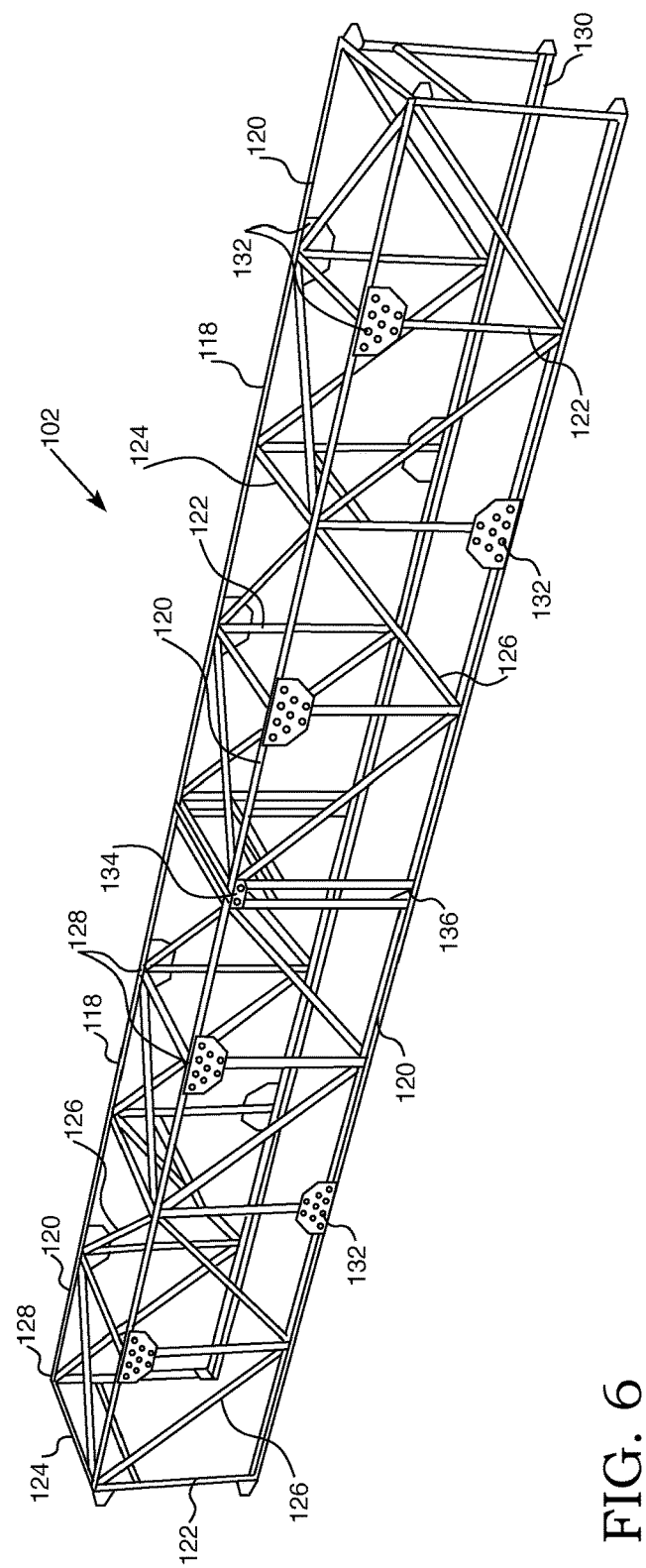
FIG. 6 is a view of an embodiment of the truss of the apparatus comprised of modules.
Figure 7:
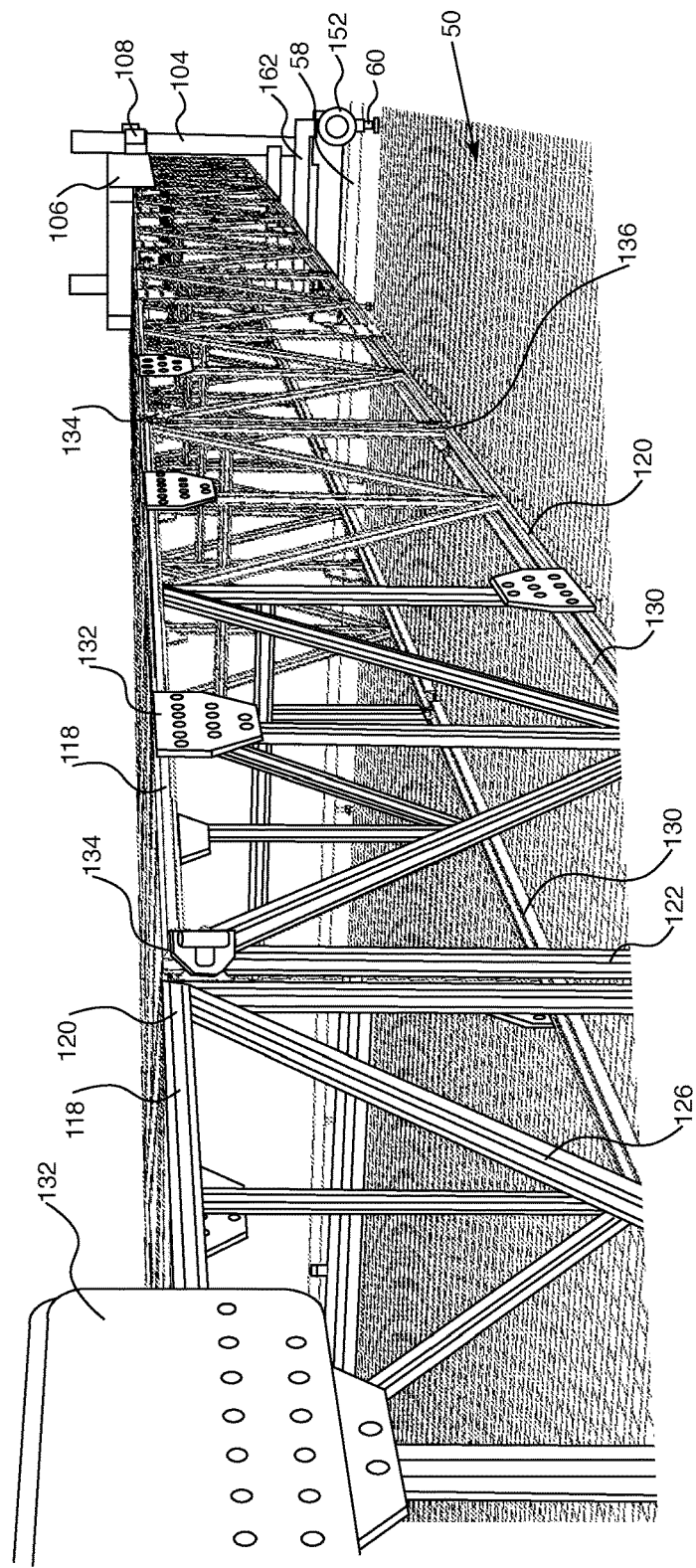
FIG. 7 is a view of one end of the truss portion of the apparatus, showing exemplary connectors between truss modules.
Figure 8:
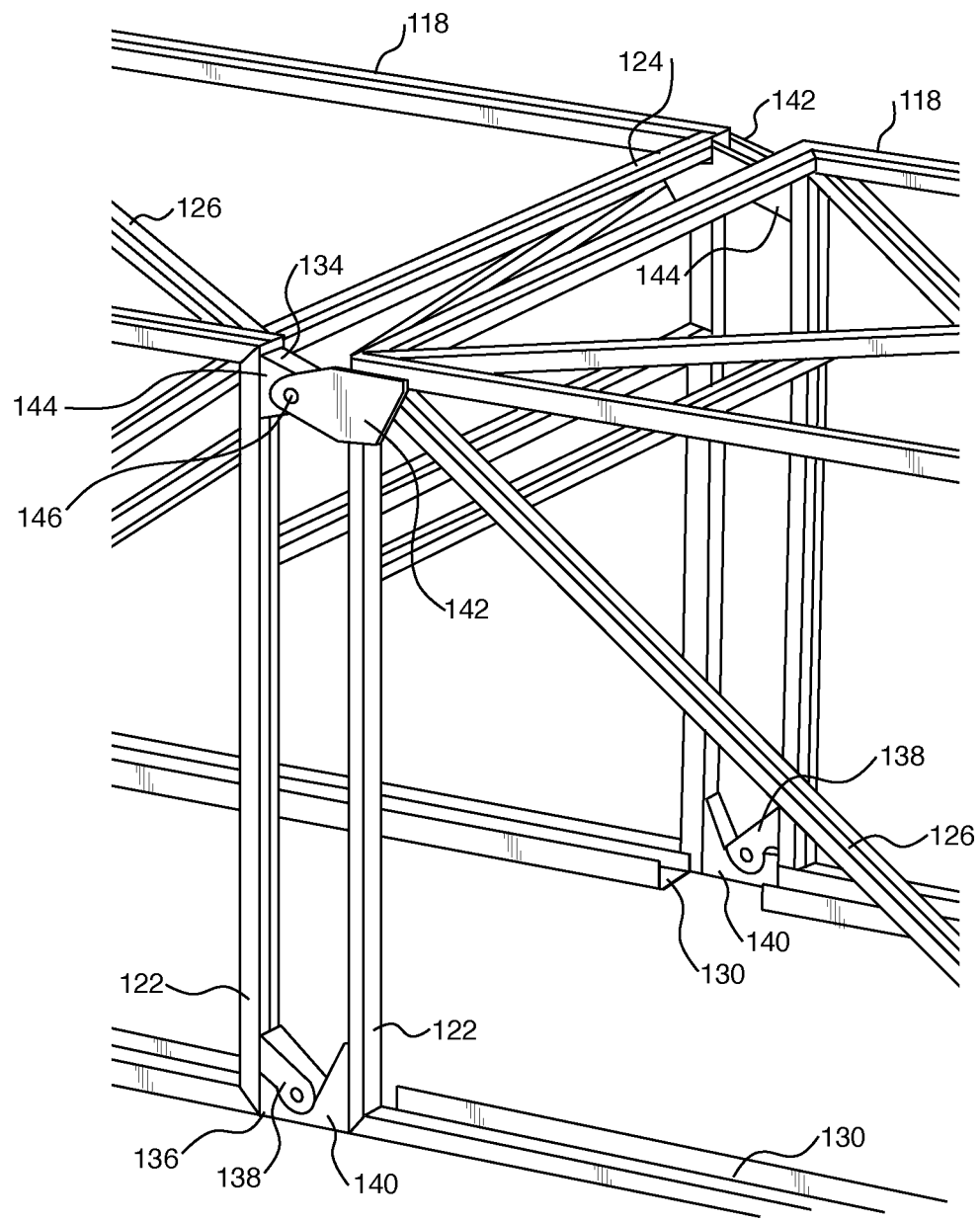
FIG. 8 is a closer view of the connectors between truss modules.

The truss 102 is suspended at each end from one of the two support frames 106, as shown in FIGS. 1, 2 and 10. Referring to FIGS. 6-8, truss 102 may, in various aspects, be constructed of upper and lower lateral beams 120, rectangular or square frame members having upper cross-bars 124 and forward and backward upright bars 122, and diagonal bars 126. Upper lateral beams 120 may be welded to support frame 106 or connected by any suitable fastener, such as bolts or screws 188, shown in FIG. 9. Stiffeners 132 may be mounted at joints 128 between the beam 120 and frame members 124, 122, and 126. Referring to FIG. 8, the truss modules 118 may be described herein as having a leading or forward end and a trailing or backwards end, wherein the leading and trailing ends of modules 118 may be structured to have formed therein or attached thereto features for connecting to each other to thereby connect adjacent modules 118. In various embodiments, the truss modules 118 may be joined by first connectors 136 comprised, for example, of a lower grooved member 140 attached on one long side of truss 102 to a lower edge of the upright bar 122 of the leading end of module 118 and a cylinder-like member 138 attached on the same side of truss 102 at a lower edge of the upright bar 122 of the trailing end of the adjacent module 118. Cylinder members 138 rests in the groove of the grooved member 140. A ramped surface on grooved member 140 allows movement of cylinder member 138 as the adjacent modules are connected. The opposite long side of truss 102 may, as shown in FIG. 8, have the grooved member 140 and cylinder member 138 reversed so that the cylinder member 138 is on the leading end and the grooved member 140 is on the trailing end. Alternatively, both types of connector members may be on the same leading or trailing end. Second connectors 134 may, for example, be positioned along the upper end of the upright bars 122 of the module 118 and in various aspects, comprise an upper pin joint having a forked member 142 attached to an upper edge of the leading end (and on the opposite long side of truss 102, to the trailing end) of the upright bars 122 and an eye member 144 attached at an upper edge of the trailing end (and on the opposite long side of truss 102, to the leading end) of the upright bars 122 of the adjacent module 118. Eye member 144 fits within the opposing faces of the forked member 142. A pin 146 connects the eye member 144 to the faces of the forked member 142 to lock the leading and trailing ends of the adjacent modules 118 together. Alternatively, both types of connector members may be on the same leading or trailing end.

The pin 146 through the pin joint constrains motion in the plane of the pin on the top corner of the module 118. To assemble adjacent modules 118, the cylinder 138 rotates in the groove 140 until the pin holes in the pin joint (142, 144) line up for insertion of pin 146. The cylinder 138, grooved member 140, eye member 144, and forked member 142 may be welded at their respective positions to the upright frame bars 122 on opposing ends of adjacent modules 118, or securely connected by any suitable known means, such as bolts or an equivalent fastener.

Figure 18:
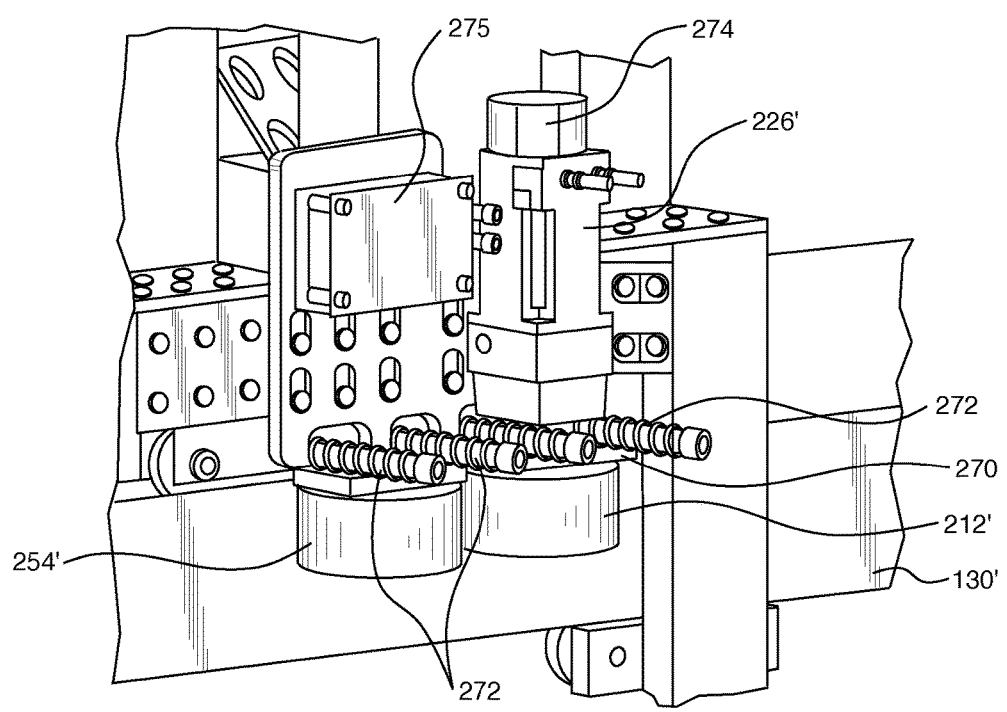
FIG. 18 is a partial perspective view of an alternative drive wheel arrangement for the carrier subassembly.

In various aspects, rails 130 run along the inside of the lower lateral beams 120 of each side of a frame member (e.g., formed by bars 122, 124, 126). The rails 130 may be welded to lower lateral beams 120 or connected with suitably strong fasteners, such as bolts or screws. Alternatively, rails 130 may be formed as an integral part of the lower beams 120 during manufacture as L shaped beams. The arrangement described provides a kinematic interface to line up the modules 118 of the gantry truss 102. Alternatively, the rails 130 may have diagonal cuts between adjacent rails on adjacent modules 118 so that the wheels 212 of the carrier subsystem 200 can ride smoothly across the gantry modules 118 and will not bump at the end edges of each module. Yet another alternative rail arrangement is shown in FIG. 18.

Figure 11:
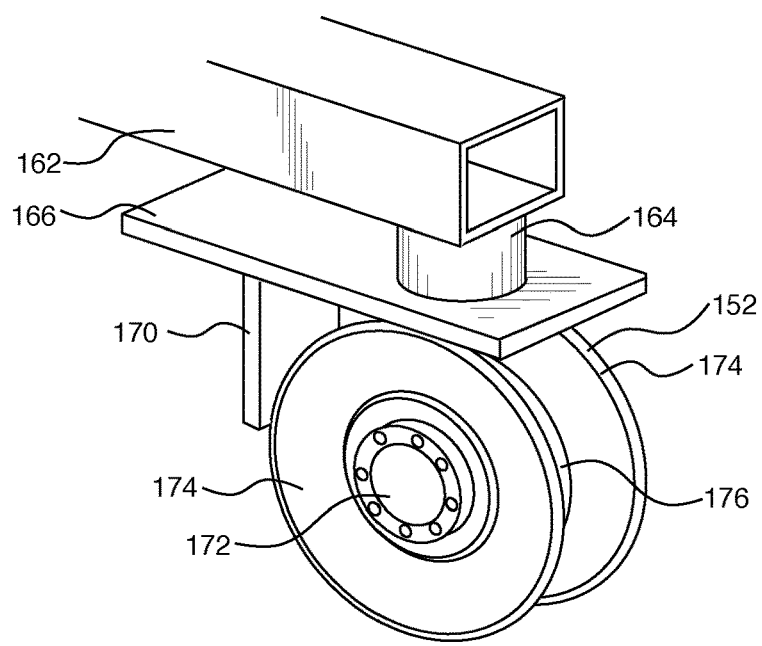
FIG. 11 is a view of an idler wheel of the gantry subassembly of the apparatus of FIG. 1.
Figure 12:
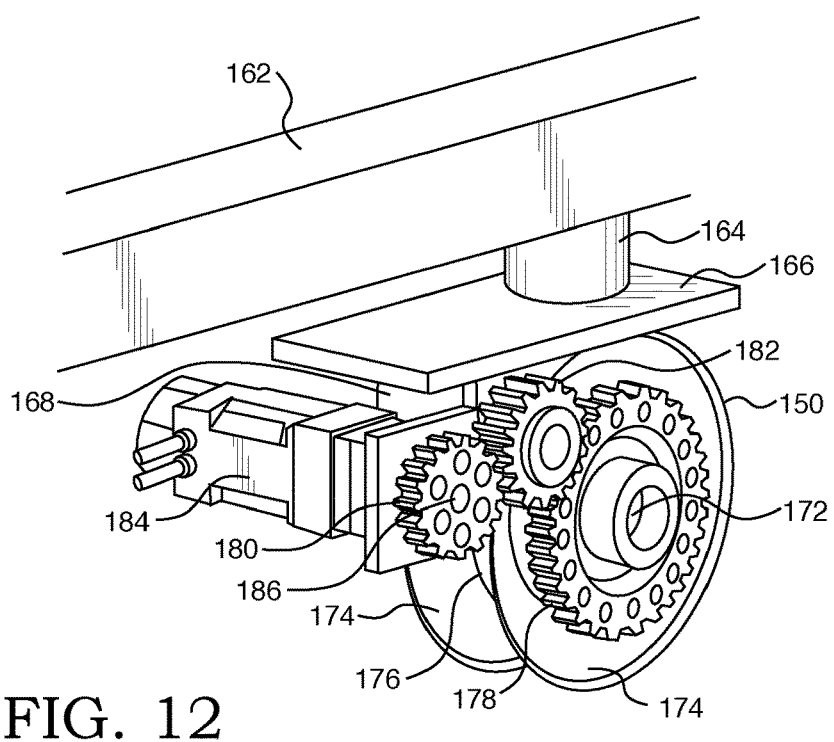
FIG. 12 is a view of the drive wheel and drive motor of the gantry subassembly of the apparatus of FIG. 1 for effecting linear or non-linear travel of the apparatus in a longitudinal direction.

Referring to FIGS. 10-12, each leg 104 of the gantry subsystem 100 rests on, and is rigidly connected to a cross-brace 162. Extending down from the underside of the cross-brace 162 are rotational effectors, such as swivel axis posts 164, which are attached to a top plate 166. The swivel axis posts rotate in clock-wise and counter-clockwise directions to allow the wheels 150 and 152 to rotate relative to the legs 104 so as to adjust position of the wheels 150, 152 to follow the curvature of the screed rail 58 as the wheels move along the rails. Extending down from each top plate 166 is a side plate 168. An axle 172 extends perpendicularly from the side plate 168 under and generally parallel to the top plate 166.

A gear driven wheel 150 is mounted on at least one axle on each side of the truss 102, and may be positioned on either the leading end or the trailing end. The gantry subsystem 100 may travel both forward and backwards along the first path, so the position of leading and trailing ends will change depending on the direction of travel. The driven wheel 150 is in various aspects, structured like the wheel of a train, having at least one and in various aspects, two flanges 174 on each side of the cylindrical or conical wheel 176, which is configured to engage the screed rail 58 on the edges of the work site. The cylinder may therefore, be concave in cross-section to seat properly and with minimal friction on the cylindrical shape of the screed rail. If the screed rail 58 has a rectangular or squared profile, then the profile of cylinder on the wheel 176 will be similarly shaped to ensure a smooth rolling engagement as the gantry moves along the screed rail.

The driven wheel 150 includes a gear 178 on one side of a flange 174 operatively mounted on the axle 172. The teeth of gear 178 engage the teeth of a driven gear 182 which in turn engage the teeth of drive gear 180. Drive gear 180 is mounted on a drive rod 186 driven by motor 184. Motor 184 may be an electric motor, a gas powered motor, or, in certain aspects, may be a hydraulic motor. Two quadrature encoders are positioned on each side of the truss 102, one on each idler wheel 152 and one on each drive wheel 150 for feedback to one of the computers 190 or 214, described below.

A power source is provided. The power source may be a generator 148, such as a diesel electric generator, a gasoline, natural gas, or battery powered generator. The power source may be hydraulic. The generator 148 may, for example, be used to provide the power output required by the gantry drive motors 184 in addition to the power required by other gantry axis electronics. In various aspects, the drive system may typically operate on 96V DC power to drive the motors 184 (one on each drive wheel) at a high rpm and maintain high electrical efficiency. Motors 184 may be any suitable motor, such as AC motors or hydraulic motors when a hydraulic power plant is used. Suitable electric generators include, without limitation, off-the-shelf 2 kW class AC generators and off-the-shelf marine grade DC generators.

In various aspects, generator 148, as shown in the Figures, may be electrically connected to an electric power source in the electronics box 160. Referring to FIGS. 1, 10 and 12, the rotation of the drive rod 186 by motor 184 is translated by gears 180, 182 and 178 into forward or backward motion of the drive wheel 150, and through axle 172's connection through plates 168 and 166 to swivel axis posts 164, cross-bar 162, and legs 104 to support frame 106 and truss 102, thereby moving the gantry subsystem 100 along the length of the screed rail 58 on the first path. The wheels may be made of steel or another suitably strong and weather tolerant material. A safety bumper (not shown), made for example, of rubber, may be added to block access to the drive assembly components during operation.

An additional idler or follower wheel 152 is, in various aspects, positioned generally under one of the legs 104 on each side of the truss 102 in those embodiments where there is only one driven wheel per side. As shown in FIGS. 10 and 11, idler wheel 152 is structured in the same manner as driven wheel 150 except that it has no gears and is not connected to a motor. Idler wheel 152 includes at least one and preferably two flanges 174 surrounding the wheel 176 whose shape, like the shape of drive wheel 152, will be configured to smoothly engage with as little friction as possible, the screed rail 58. Idler wheel 152 is operatively connected to one of the legs 104 on each side of truss 102 by its connection through axle 172 to side plate 168 which extends downwardly from top plate 166 and through swivel axis post 164 to cross-bar 162 on which the legs 104 are mounted. Idler wheel 152 may be equipped with an encoder (not shown) to measure drive wheel slip along the rails. In addition, rail curvature sensors (not shown) may be integrated into the swivel axis pivot posts 164 mounting the drive wheel and the idler wheel to the legs 104. An end plate 170 or mud flap may extend from top plate 166 on one or both of the leading or trailing ends of idler and drive wheels 152, 150 to guard the wheel components from debris during operation.

The gantry electronics comprises one or more electronics housings or boxes 160 mounted for example, on support frame 106. The electronics box 160 may house a central processor unit (e.g., a computer 190) acting as slave to the carrier axis subsystem 200 computer 214, described more fully below, drive axis motion controllers 192, gantry side safety watchdog timer (not shown), power relay 194, sensor interface electronics 196, actuator interface relays (not shown), and power conversion electronics 195. The gantry computer 190 commands the gantry axis motion controllers 192 and the remote starting of the power generator. The gantry computer 190 may also log safety video from incident cameras (not shown), process rail curvature sensor 164 inputs, and process safety proximity sensor inputs (not shown). All of the electronics components for the gantry electronics are well known, commercially available components and need not be described in detail herein. Those skilled in the art know or can readily ascertain their functions and structures from the literature.

In various aspects, safety features may be included in the assembly 10. For example, attached to the legs 104 and electronics box or boxes 160, there may be robot status warning lights (e.g., stack lights) and manual emergency stop buttons (not shown). In addition, optional low resolution video cameras (not shown) capable of recording video of the area near the legs 104 to capture a record of any safety related incidents may be provided. Proximity sensors (not shown) may also be provided to be able to trigger a motion control fault when an object or obstacle approaches a gantry subsystem leg 104 from the direction of motion.

Electrical wiring between the gantry subsystem 100 power source, electronic box or boxes 160, sensors, and motion controllers may be cabled across the truss 102 in a single retractable cable reel with durable, shielded cabling. Alternatively, signals between the gantry subsystem slave computer 190 and the carrier subassembly master computer 214 may be carried via a wireless link, such as a radio frequency (RF) link or an optical link. In another alternative arrangement, the electronic communication may be carried via a dynamic, self-retracting cable reel.

The Carrier Subassembly

The carrier subassembly 200, shown in FIGS. 10 and 13-22, may, in various aspects, include a rigid frame or carriage 202 that is comprised of upper frame bars 216, side frame bars 218 and lower frame bars 220, which may be welded to each other, or otherwise connected by any suitable means, to form a box-like structure. However, any suitable shape that allows carriage of the subassembly components will suffice. In the structure shown, a side brace bar 238 may additionally be provided on at least two opposing sides of carriage 202, connected, by welding or any other suitable means, at each end to adjacent side frame bars 218. Side brace bars 238 add structural stability to carriage 202.

Figure 13:
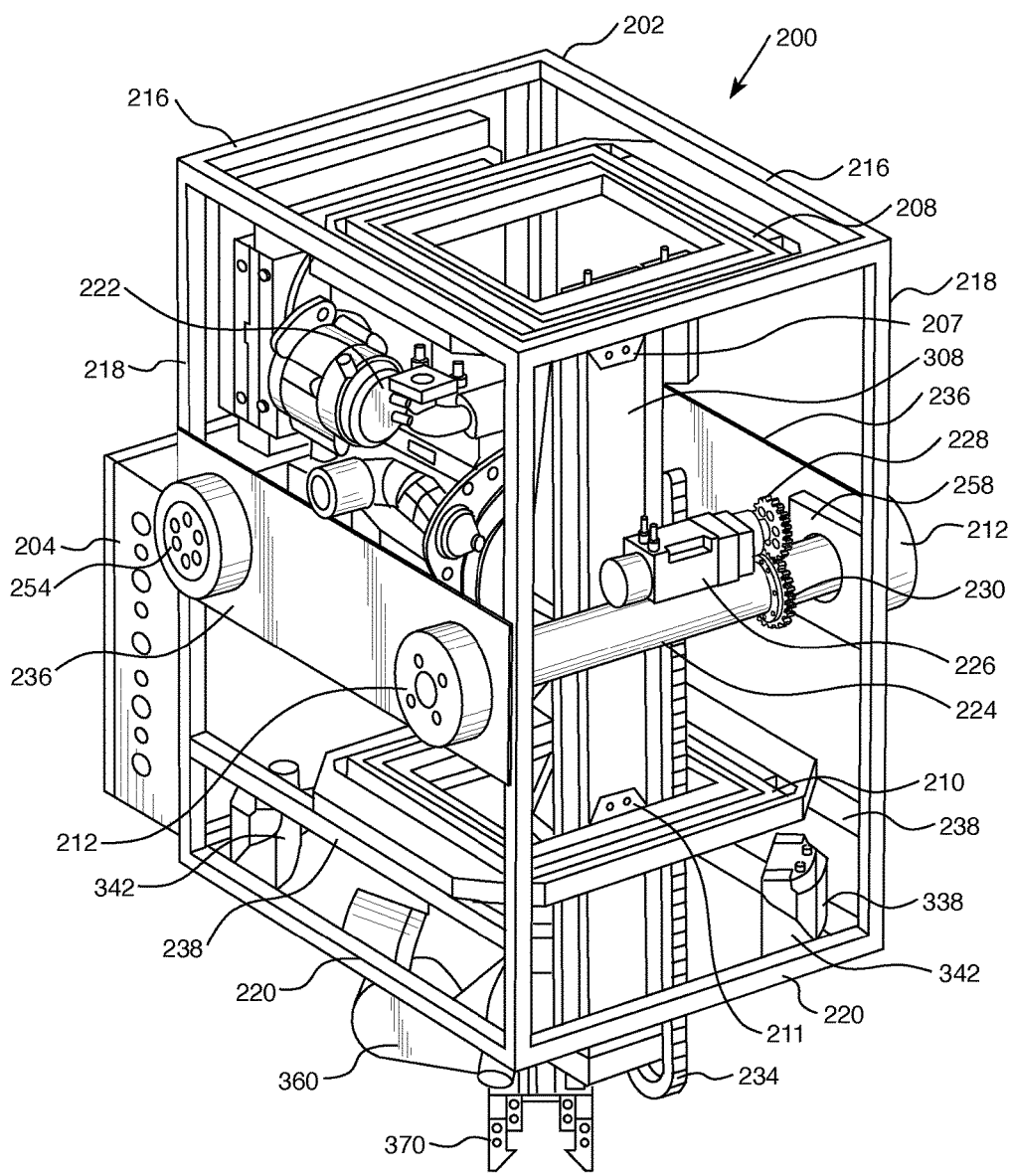
FIG. 13 is a perspective view of one side of an embodiment of the carrier subassembly of the apparatus of FIG. 1.
Figure 16:
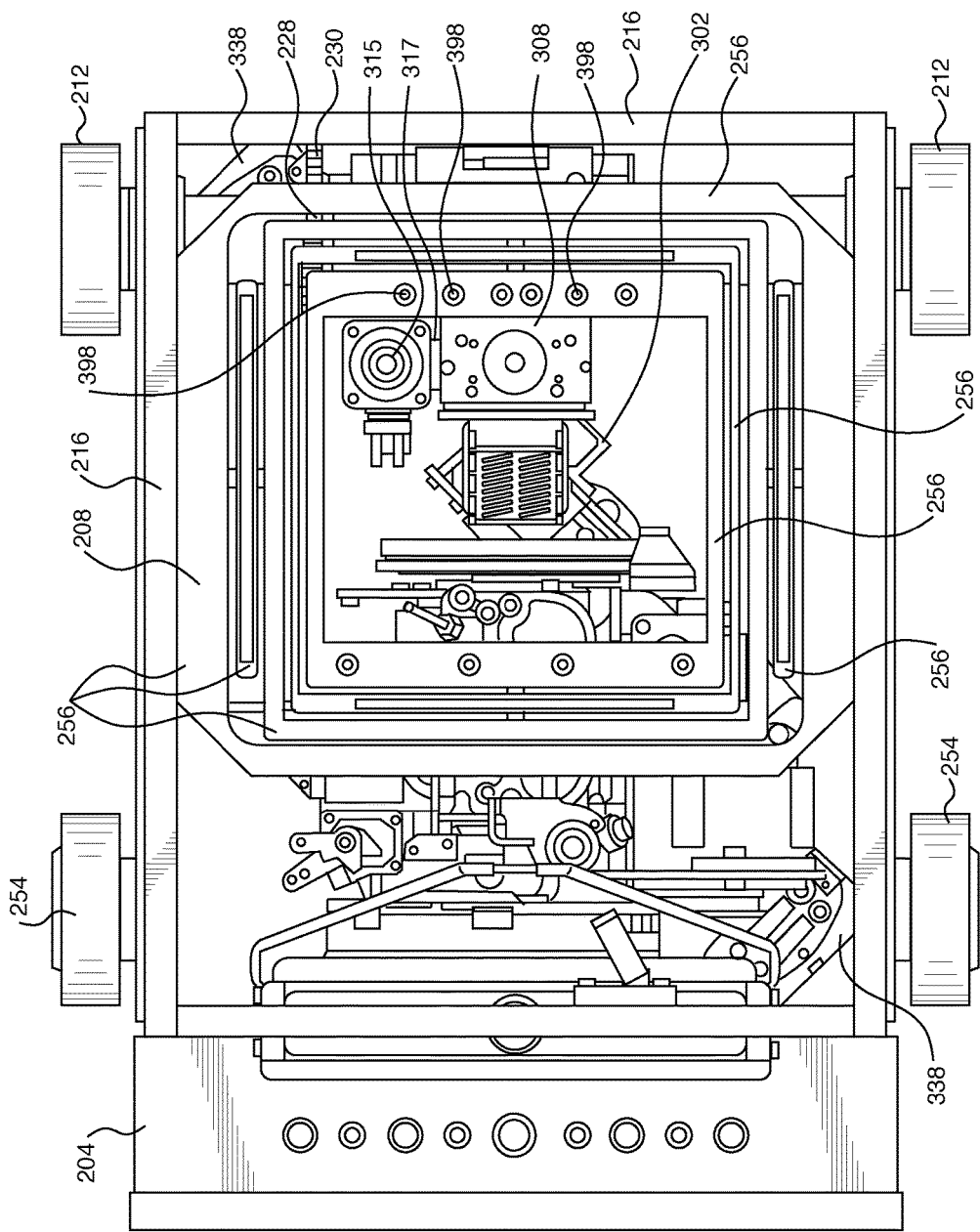
FIG. 16 is a top plan view of the carrier subassembly of FIG. 13.
Figure 17:
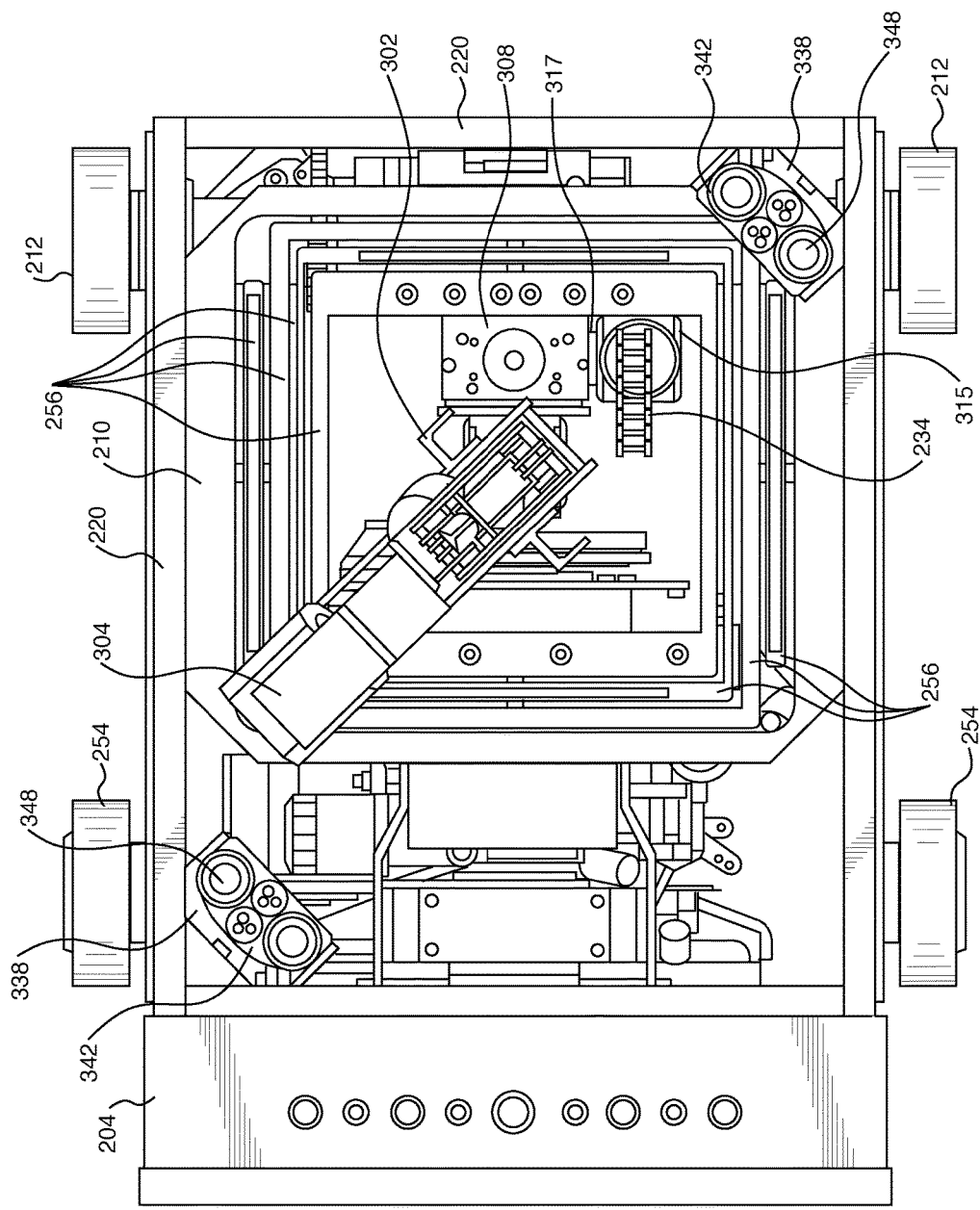
FIG. 17 is a bottom plan view of the carrier subassembly of FIG. 13.

As shown in FIGS. 13 and 16, a top flex plate 208 is connected by any suitable means, such as welding or by fasteners (e.g., bolts, screws, etc.), to two opposing top frame bars 216. A bottom flex plate 210, shown in FIGS. 13 and 17, is provided that may, for example, be connected by any suitable means to the two opposing side brace bars 238. Flex plates 208 and 210 give flexural support to the tool actuation subassembly 300 components that are carried on the carriage 202 and described more fully below. Flex plates 208, 210, in various aspects, may be formed from precision cut metal, such as stainless steel or another metal suitable for exposure to the outside weather conditions. The precision cuts form a pattern of interconnected flexural sections 256 (see FIGS. 16 and 17) that allow movement in at least two degrees of freedom (i.e., pitch and roll, or in other words, tilting up or down in any direction from a plane parallel to the upper and lower frame bars 216, 220) to give a spring centered motion to the tool actuation stage. Alternatively, the top and bottom flex plates 208, 210 may be formed from multiple distinct sections welded or bolted together to form the flexural structure.

Figure 14:
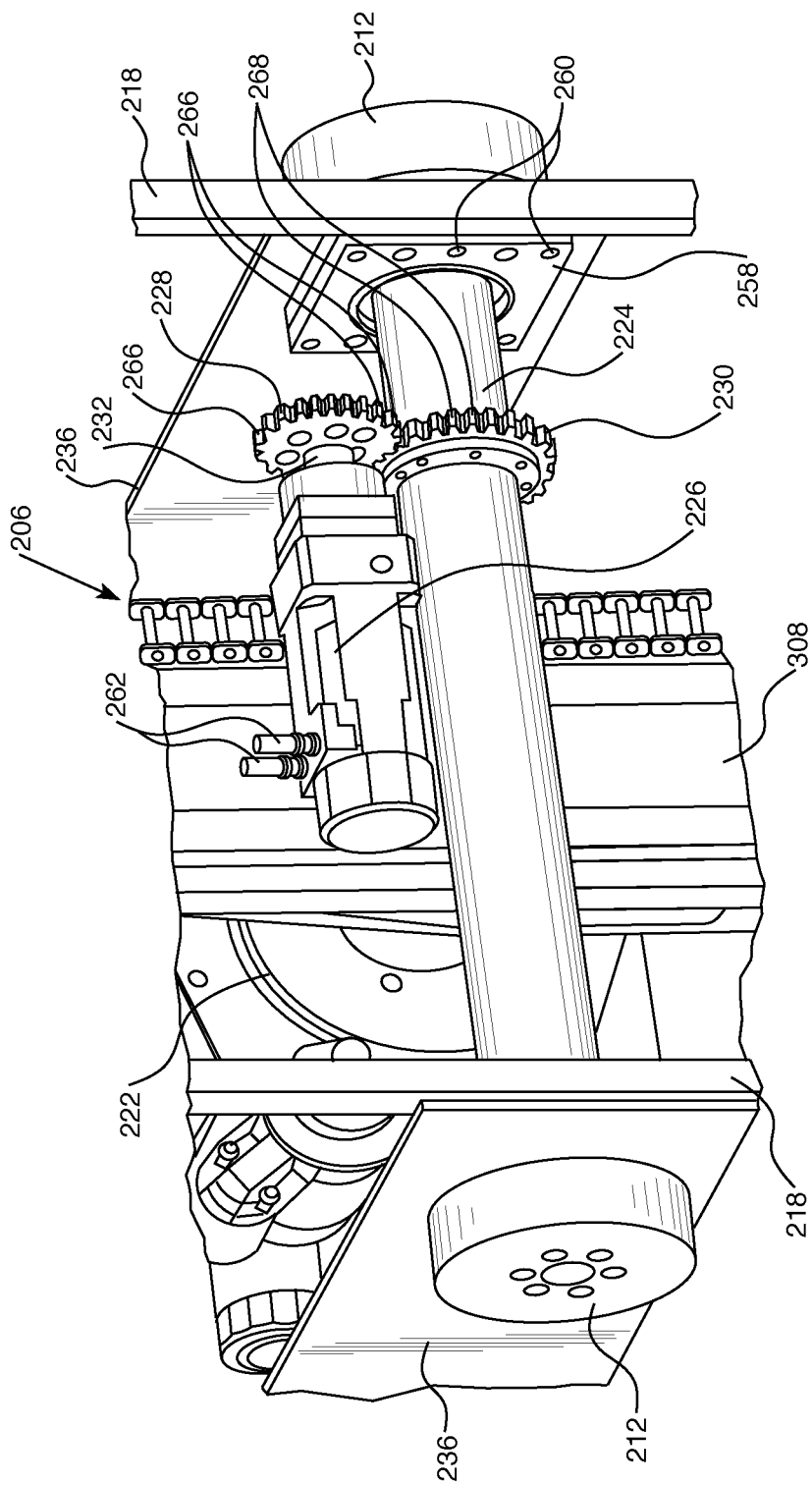
FIG. 14 is a partial view of the drive system for the carrier subassembly, showing the drive wheels, drive motor, and gears for effecting transverse movement of the carrier subassembly across the truss portion of the gantry subassembly.

Carrier subassembly 200 includes a drive system 206. Referring to FIG. 14, drive system 206 includes a drive motor 226 mounted to the carriage or to a carriage frame member such as another brace bar 238 (not shown), drive rod 232, a drive gear 228 and a driven gear 230. Driven gear 230 is mounted on drive wheel axle 224. Side plates 236 are positioned on each side of carriage 202 between adjacent side frame bars 218. Each end of drive axle 224 extends through an appropriately sized hole in side plates 236 to connect to a drive wheel 212 and is secured mounting plates 258 and bolts 260. Electrical wires 262 (shown in part for ease of illustration) are electrically connected to the main carrier power source 222, which may in various aspects be another generator, such as a diesel electric generator, a gasoline, natural gas, or battery powered generator. The power source may be hydraulic. The carrier power source 222 may be mounted on the carriage 202. Having a second generator 222 for carrier subassembly 200 eliminates the need for dynamic power cabling between the gantry subassembly 100 and the carrier subassembly 200. The second generator 222 may be any suitable generator, but in various aspects, may be substantially identical to that of the gantry subsystem, generator 148, for ease of maintenance. Power from the generator powers the drive motor 226, turning drive gear 228 via drive rod 232. The teeth 266 of drive gear 228 mesh with the teeth 268 of driven gear 230. Motion of drive gear 228 moves driven gear 230, which in turn, causes axle 224 to rotate, thereby turning drive wheels 212.

Figure 15:
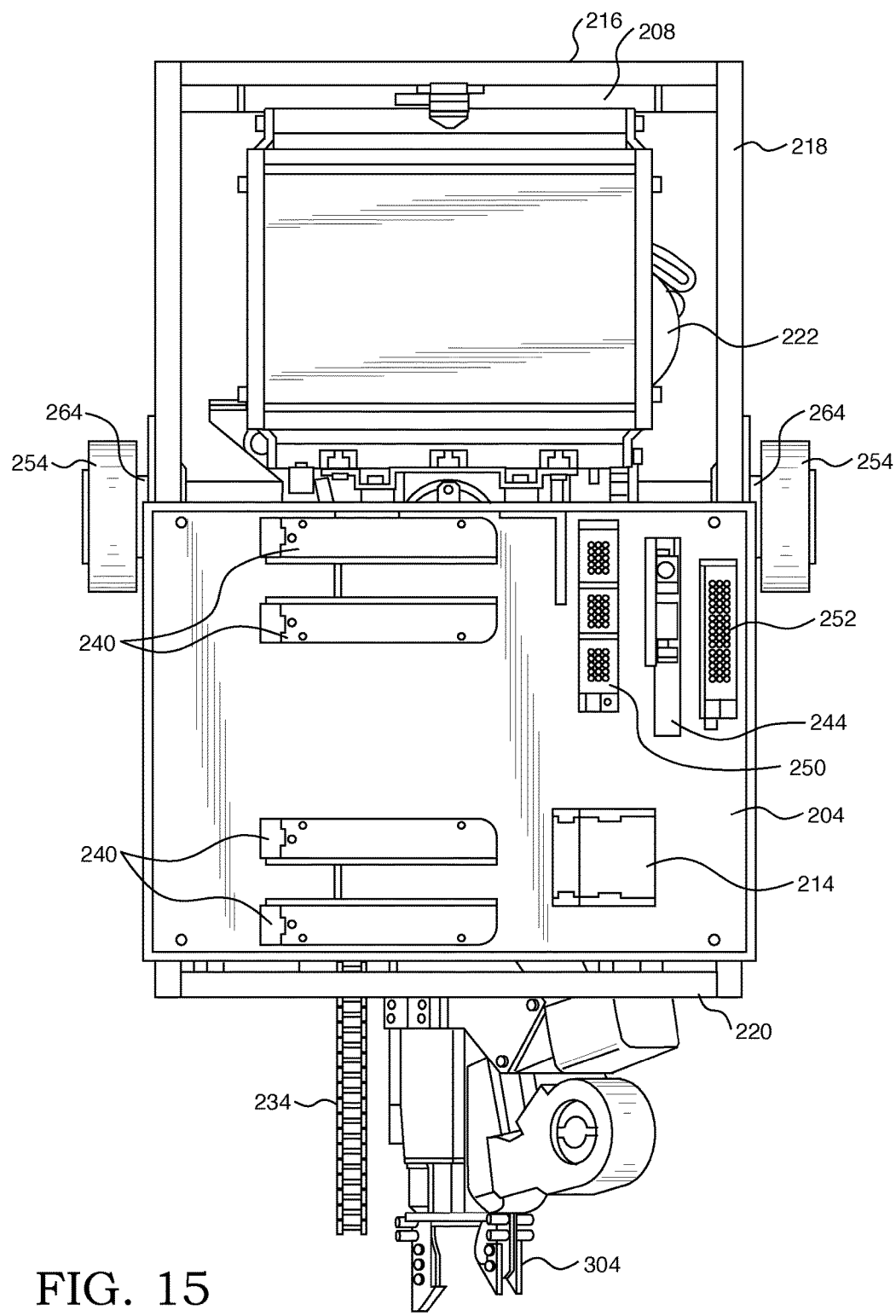
FIG. 15 is an end view of the carrier subassembly of FIG. 13.

The carrier subassembly drive wheels 212 are preferably made of steel and are positioned to ride on the truss 102 rails 130 on the lower lateral bars 120 of gantry subassembly 100. The rails 130 may also be made of steel to maximize friction and minimize both slip and racking forces. In various aspects, as shown in FIG. 15, two carriage support wheels 254 may be mounted on rotatable rods 264 connected to side plates 236. Support wheels 254 are follower wheels, similar to gantry subassembly wheels 152. One support wheel 254 is positioned on each side of carriage 202 and together with drive wheels 212, the support wheels 254 support the carrier subassembly 200 components on rails 130 as the carriage 202 and its components move laterally across the truss 102, along the second Y-axis path of motion, powered by the drive system 206. In various aspects, the support wheels 254 may be encoded to serve as idler feedback, tracking any accumulated slip or racking over time to enable active software correction if needed.

An alternative embodiment of drive wheel arrangement is shown schematically in FIG. 18. The drive wheels 212' and support wheels 254' are positioned to ride with the axis of rotation of the wheels in a vertical direction and the wheel cylindrical surfaces at a 90° angle relative to the wheel arrangement previously described, along a rail 130' whose rail surface lies on a vertical plane. A drive motor 226' is mounted above a support plate 270 and is connected to drive wheel 212' by a drive rod (not shown). A motion control amplifier 275 is operatively connected to drive motor 226'. A series of preloaded springs 272 bias wheels 212' and 254' towards the rail 130' to maintain contact between the rail 130' and the wheels 212' and 254'. An integral motor brake 274 is operatively connected to drive motor 226'. Drive motor 226', like drive motor 226 described above, is electrically connected to generator 222 and computer 214.

Figure 19:
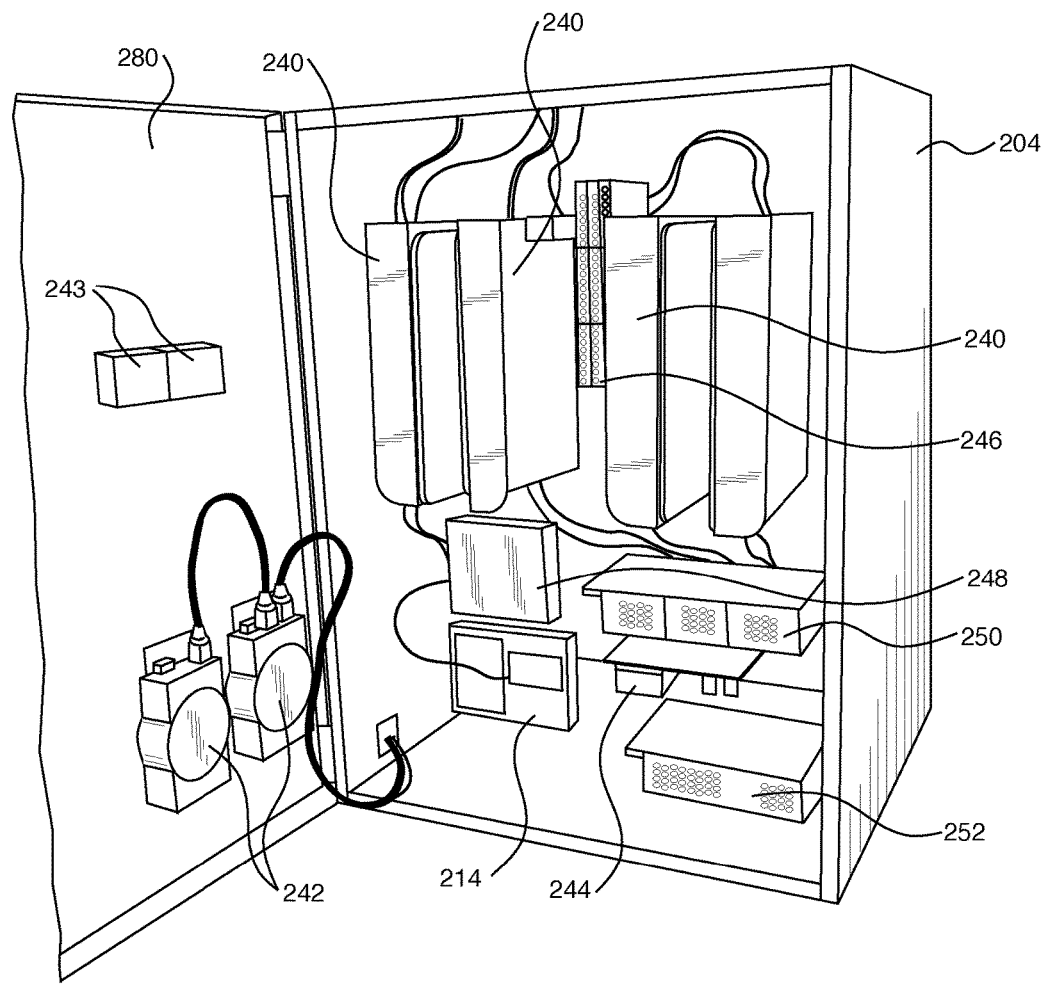
FIG. 19 is a view of an embodiment of the electronics box on the carrier subassembly of FIG. 13.
Figure 20:
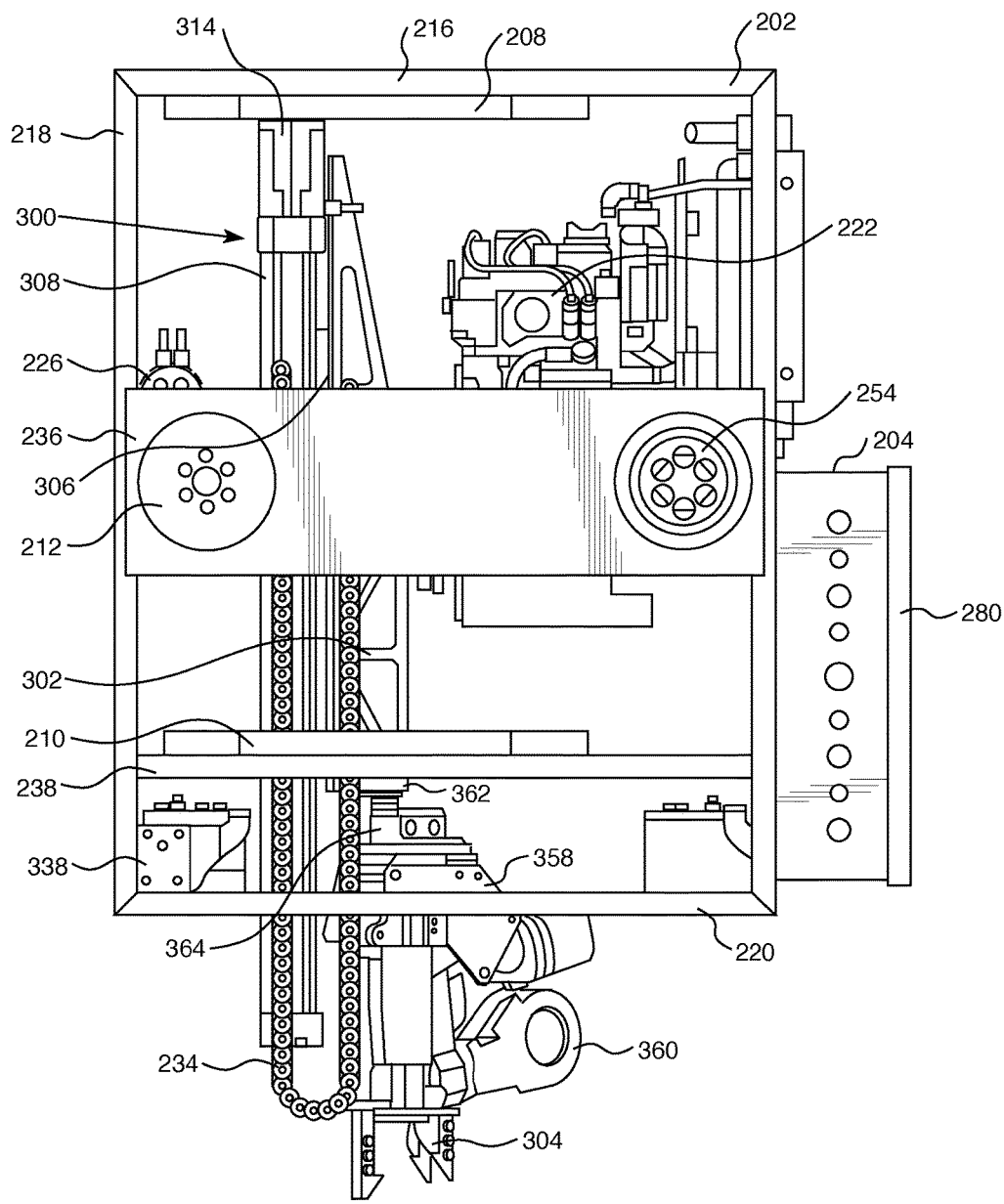
FIG. 20 is a side view of the tool actuation subassembly of the apparatus mounted on the carrier subassembly.
Figure 21:
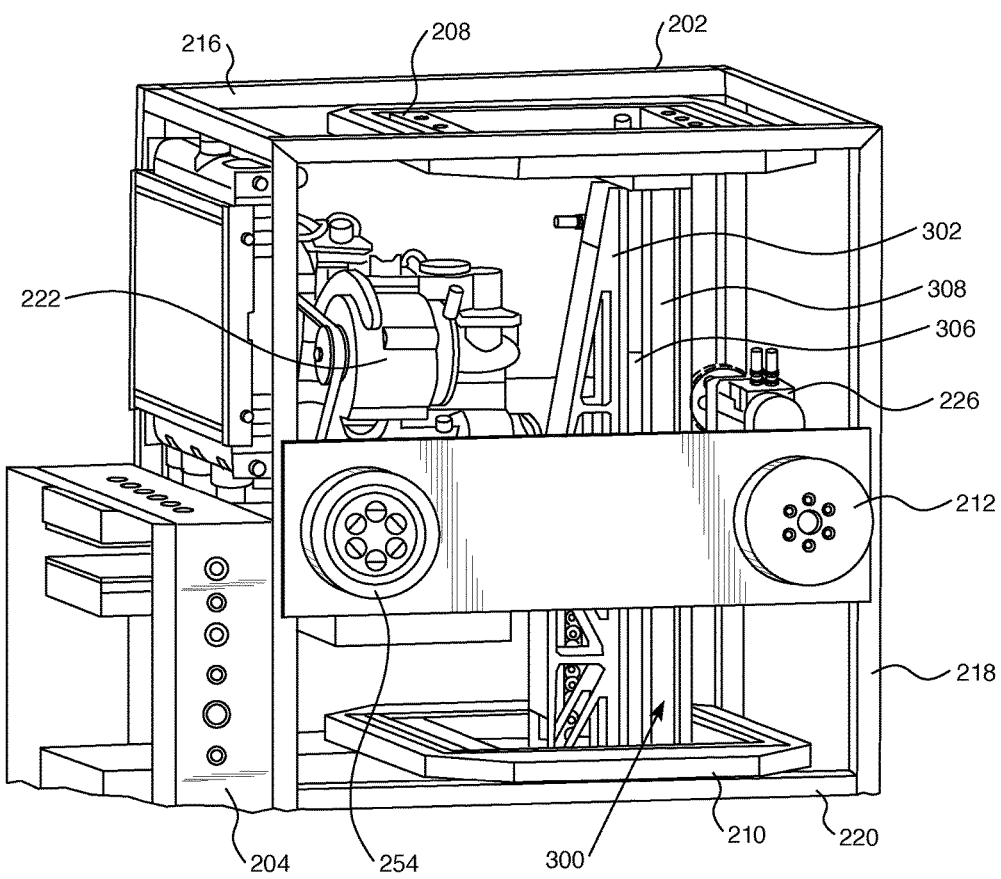
FIG. 21 is a partial perspective view of the tool actuation subassembly of FIG. 20.
Figure 22:
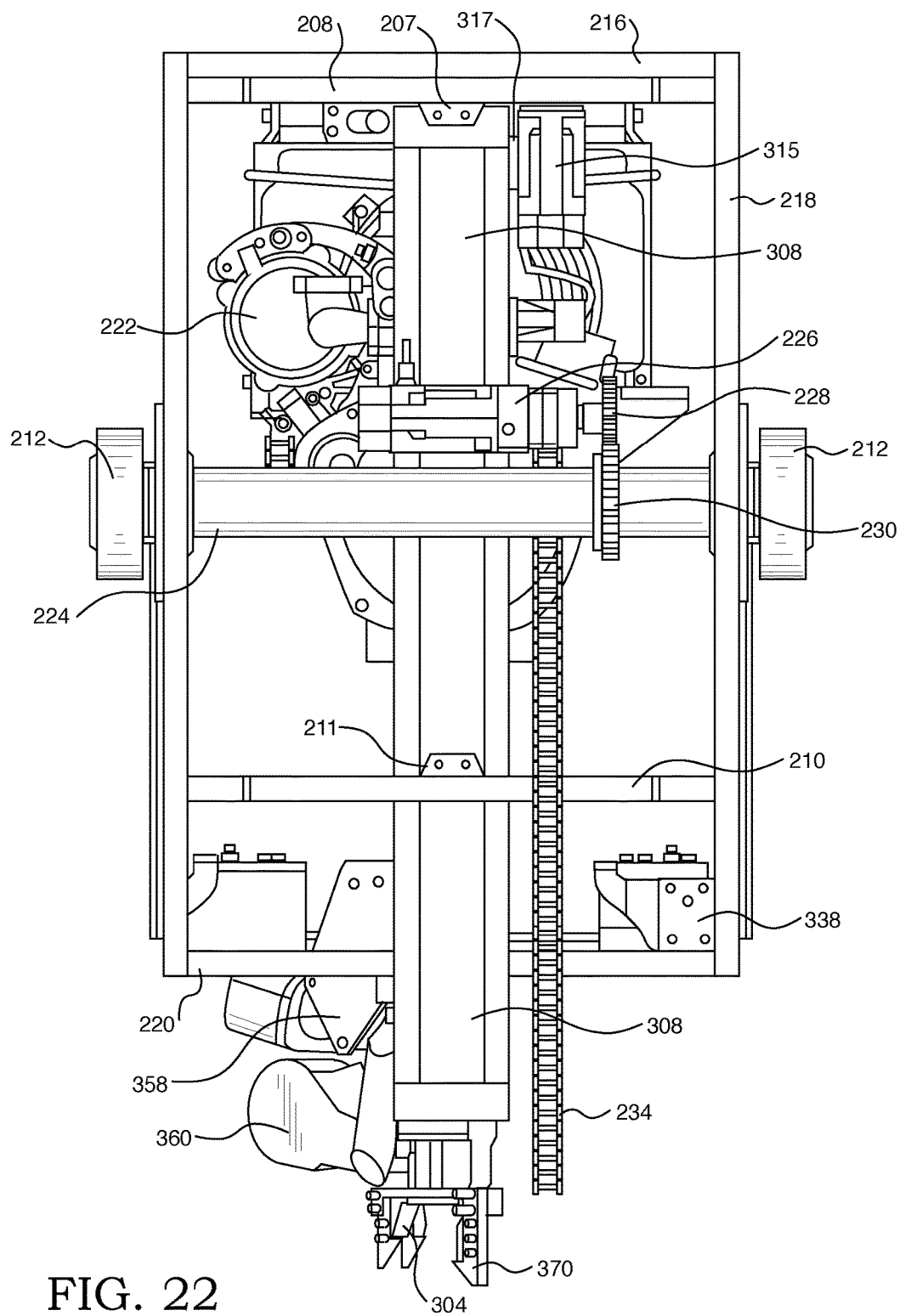
FIG. 22 is an end view of the carrier and the tool actuation subassemblies of the apparatus.

Referring to FIGS. 15 and 19, the carrier electronics may include one or more electronics housings or boxes 204 having a door 280 mounted, for example, on side frame bars 218, and containing a central processor unit or computer 214 acting as master to the gantry subsystem computer 190, power conversion electronics 244 for the computer 214 and sensors, power conversion electronics 250 for the computer 214, an Ethernet switch 248, sensor interface electronics 242, power conversion electronics 252 for the tool 360, one or more power conversion electronics for the motor drive power supplies 240 (four are shown), a power distribution bus bar 246, and relays 243 for the watchdog timer and tool actuator interface. In various aspects, there may be one drive power supply 240 for each axis of motion. In the embodiment of the assembly shown, there are four drive power supplies 240, one for each drive motor 184 on each side of the truss 102, one for the carrier subassembly drive motor 226, and one for the tool actuator drive motor 315. The power conversion electronics take in alternating current (AC) and convert it to direct current (DC), which is fed to motion control amplifiers for motion control and relay of smaller power supplies to apply a higher current, as needed. For example, the motion control amplifiers may read encoder feedback from drive wheel motor and idler wheel encoders to determine the distance traveled by the carriage 202 and the power needed. The current to the motor can be adjusted to achieve either a desired speed or potential output. The motion control amplifiers determine how much current the motor needs and adjusts the current output accordingly in response to input from idler and drive wheel motor encoders and Hall-effect sensors. Motion control amplifiers are commercially available and any suitable amplifier will suffice.

The carrier subsystem computer 214 commands the carriage and actuator subsystem motion controllers to command remote starting of the power generator 256, and to perform all primary autonomous system functions such as perception, localization, planning, health and status messages, controller radio communication, perception sensor communication, and other system functions.

Attached to the carriage 202 and electronic box or boxes 204 may be one or more robot status warning lights (e.g., stack lights) and one or more manual emergency stop buttons. In addition, low resolution video cameras capable of recording video of the area in front of and behind the carriage to capture a record of any safety related incidents may be provided. Also, optional proximity sensors (not shown) may be provided on the carriage 202 to be able to trigger a motion control fault when an object or obstacle approaches the carriage 202 from the direction of motion.

Both of the carrier and gantry subassembly electronic boxes 204, 160 may use commercially available components known to those skilled in the art to be suitable for outdoor use.

The internal frame structure 216, 218, 220 of carriage 202 is preferably maintained as an open structure where possible to facilitate assembly and maintenance. However, the entire carriage 202 may be enclosed in a housing (not shown) or shrouded on the sides and on the top to protect the components from environmental conditions and incidental contact.

The carrier subsystem 200 further includes perception sensors 340. In various aspects, the perception sensor 340 may be any suitable three dimensional perception camera that utilizes stereo vision, laser scanning, laser time-of-flight, or any other mean of imaging a scene in three dimensions. The perception sensor may include, for example, a pair of stereo vision cameras 342. For purposes of this detailed description, the perception sensors 340 will be described and shown as stereo vision cameras 342, but those skilled in the art will appreciate that other three dimensional sensors may be substituted.

In various aspects, there may be at least one and preferably two or more color stereo vision cameras 342, such as MultiSense S7 cameras. An exemplary stereo camera system is disclosed in pending U.S. published Patent Application, US2016/0227193. The cameras are attached with mounting brackets 338 to the frame of the carriage 202 at a rigid distance from each other so that the precise distance between images from each camera 342 is known and programmed into the perception functions of the system software.

Figure 25:
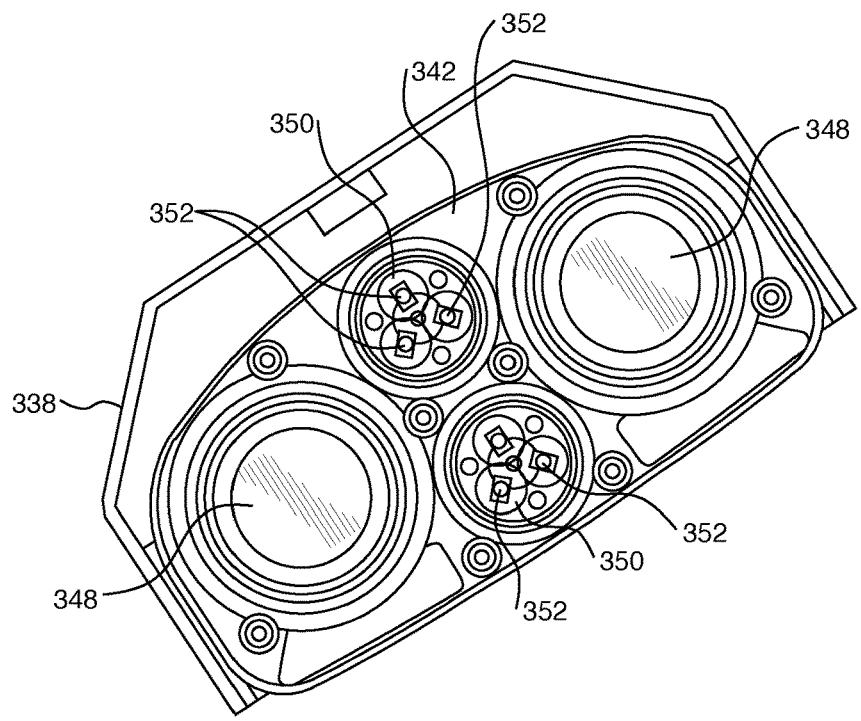
FIG. 25 is a front view of a stereo vision camera embodiment of a perception sensor mounted on the carrier subassembly.
Figure 26:
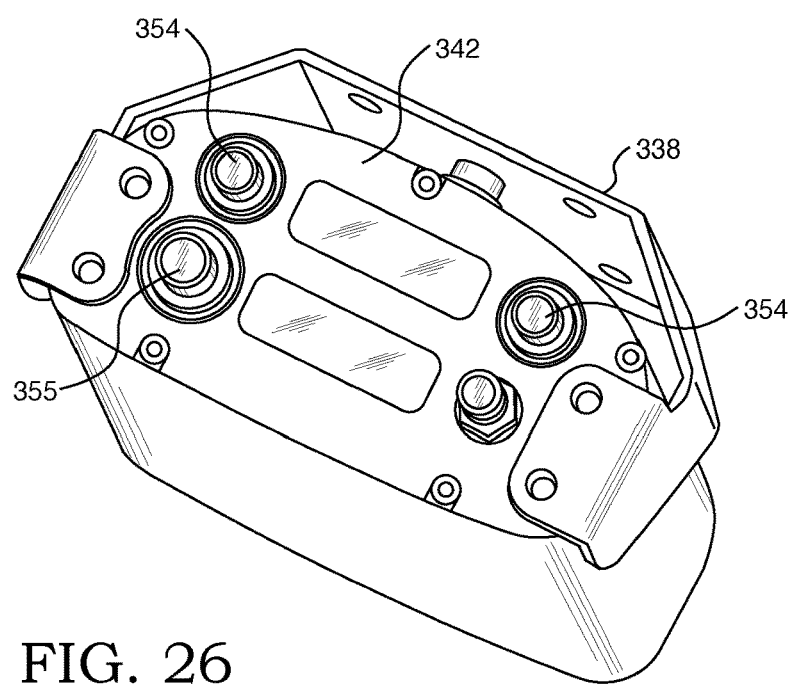
FIG. 26 is a rear view of the embodiment of the stereo camera of FIG. 25.

Referring to FIGS. 25 and 26, each camera 342 is shown as having two fixed focal length lenses 348 and lights 350, each light preferably having multiple light source 352, such as bulbs or light emitting diodes (LED), to provide light across a wide area. Additionally or alternatively, wide area lighting may be mounted on the gantry subassembly 100 or the carrier subassembly 200. The backs of the cameras include connectors 354 for attachment to input and output cables (not shown) directly or indirectly connected to Ethernet network switch 248 and then to computer 214. The perception sensor power is received from one of the power conversion electronics (e.g., 244).

Figure 27:
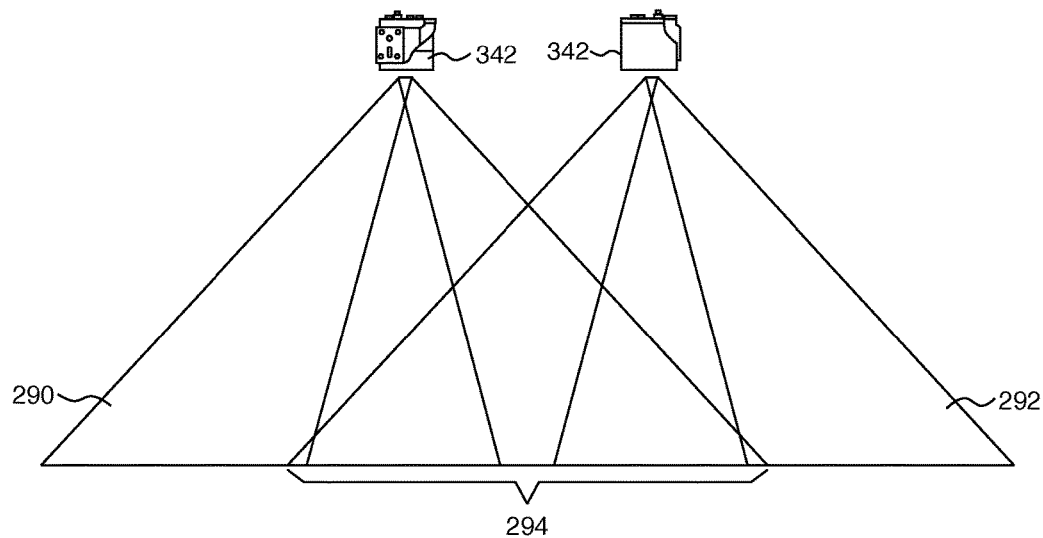
FIG. 27 is a view of the overlapping pattern of the stereo cameras' fields of view.
Figure 28:
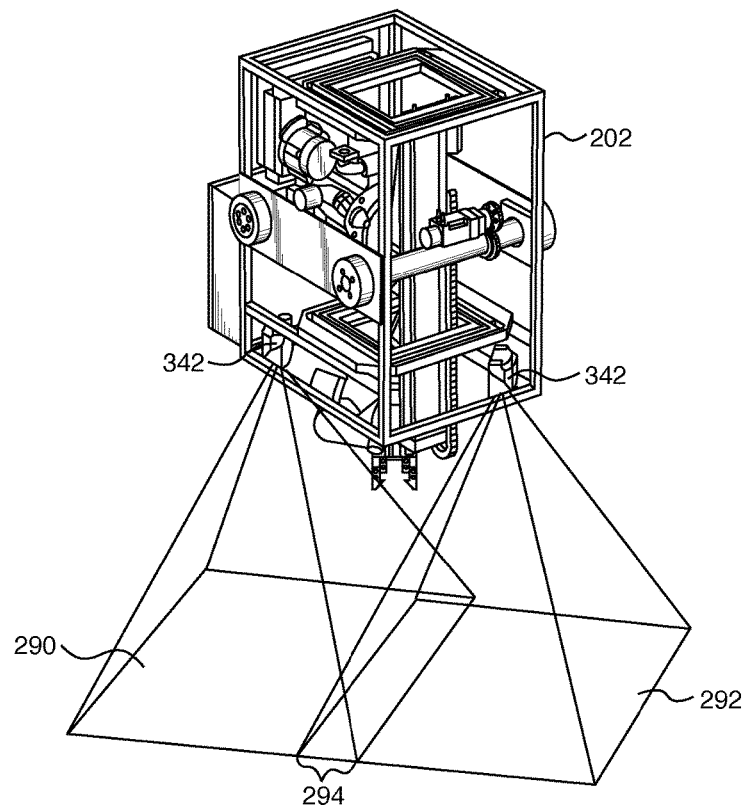
FIG. 28 is a perspective view of the overlapping pattern of the stereo cameras' fields of view.
Figure 29:
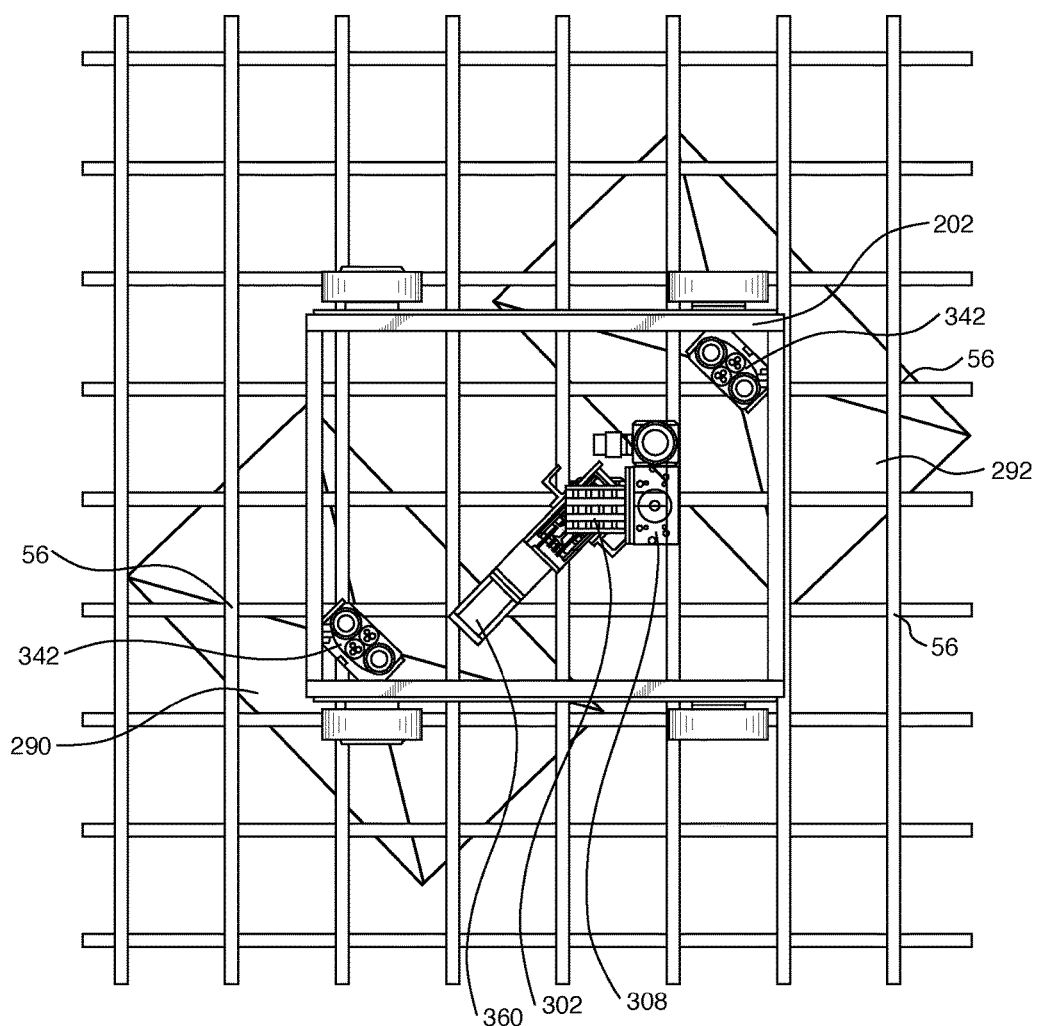
FIG. 29 is a top plan view of a non-overlapping pattern of the stereo cameras' fields of view.

The perception system may also include the ability to sense color. The addition of color sensing enables the software objective to identify already tied intersections 56 on rebar mat 50 (for example, yellow wire on green or blue epoxied rebar 52, 54). As shown in FIGS. 27-29, the addition of a second perception sensor 340, such as a second stereo camera 342, expands the fields of view 290 and 292 and in various aspects as shown in FIGS. 27 and 28, may allow for an overlapping field 294 for enhancing intersection 56 identification symmetrically about the end-effector 304. This arrangement enables viewing of each target site of operation for the end-effector immediately before use as the carriage 202 travels in either lateral direction back and forth across the width of the work site. For example, when the target site of operation is a rebar intersections 56, the end-effector 304 is a tie gun, the use of two cameras 342 increases the fields of view 290 and 292, increases intersection 56 location accuracy and decreases sensitivity to rebar motion during operation. Having more than one camera 342 increases system reliability through lower risk perception and path planning. In addition, intensity variable lighting may be added to the carriage 202 to enable optional night time operation.

The Tool Actuation Subassembly

Figure 23A:
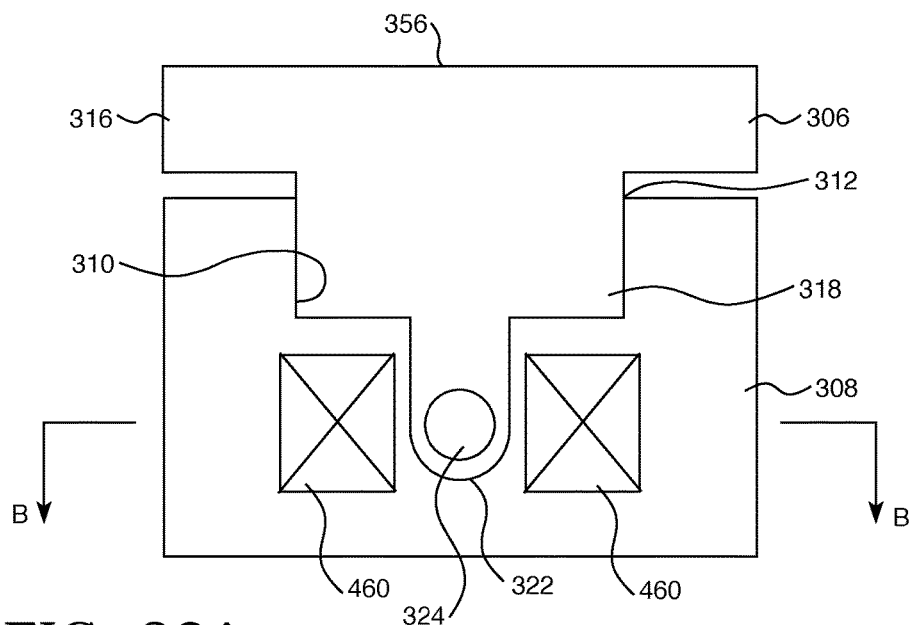
FIGS. 23 A-B schematically illustrate one possible embodiment of a motion actuator, showing exemplary components of a ball screw system in the tool actuation subassembly for effecting linear motion on the z axis of the tool actuation subassembly.
Figure 23B:
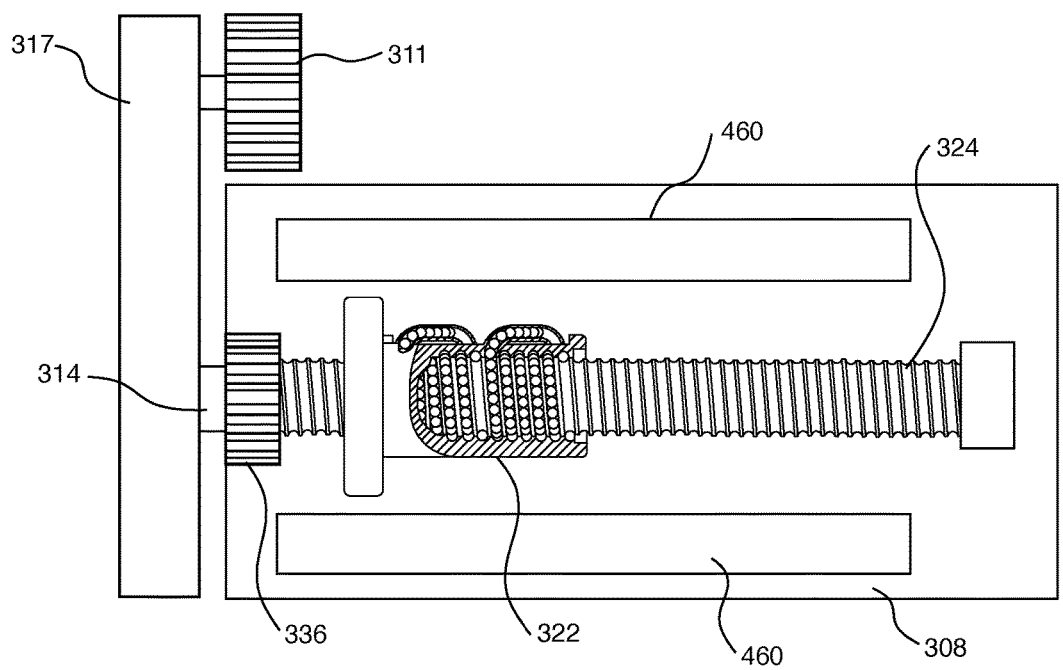
Figure 24:
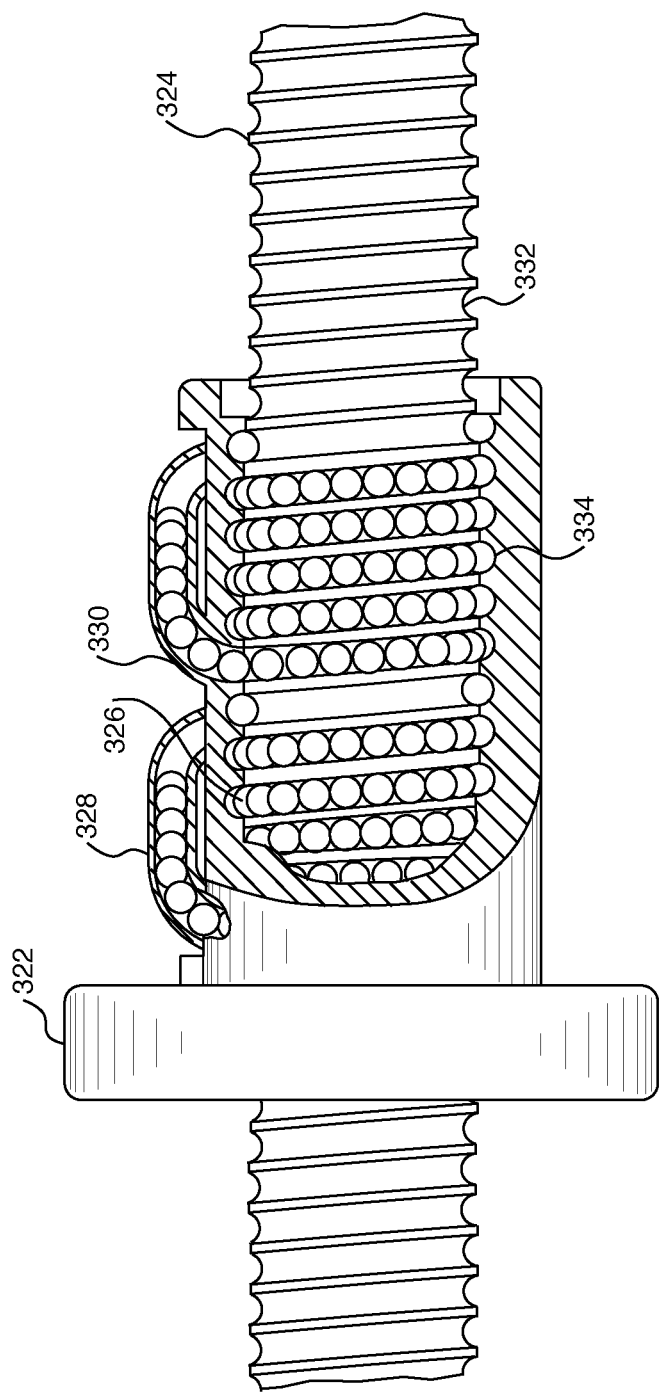
FIG. 24 is an enlarged view of an embodiment of ball bearings traveling on the grooves of the ball screw and nut of FIG. 23, showing the ball bearings in the grooves and in a ball deflector and return path.

The carriage 202 carries the tool actuation subassembly 300. The tool actuation subassembly 300 includes a motion actuator, which may be in the form of a linear motion actuator, a delta actuator, or a parallel kinematic actuator. Exemplary linear motion actuators include those based on belt drive systems, hydraulic cylinders, or gear mechanisms well known in the art. An exemplary linear actuator is shown in FIGS. 23 and 24 as a ball-screw actuator. Those skilled in the art will appreciate that any suitable known linear actuator may be used to guide the motion of the tool actuator along the third path, generally along a z axis, shown in the figures as being substantially vertical in orientation. For purposes of the detailed description, an exemplary weatherized industrial ball screw actuator is shown and described. Referring to FIGS. 20-24, an embodiment of a linear motion stage is shown. In various aspects, the linear motion stage includes an elongate hollow column or housing 308 attached to top flex plate 208 of the carrier subassembly 200 by bracket 207 and to bottom flex plate 210 by bracket 211. An actuator drive system is provided, which may include drive motor 315 and gear assembly contained in gear box 317 in operative connection to the linear motion actuator.

The housing 308 includes a slot 312 along a portion of its length, and in various aspects, along a majority of its length, and an interior elongate cavity 310 along at least a portion of its length. A sliding block 306 includes an outer section 316 and an inner section 318 and a nut 322. Linear bearings 460 are provided in housing 308 to provide load capacity to the motion actuator. Block 306 may ride along linear bearings 460. The nut 322 is part of a ball screw assembly, one possible embodiment of which is shown schematically in FIGS. 24 A and B and FIG. 25. The ball screw assembly also includes a screw 324. The screw 324 and nut 322 each have matching helical grooves 332, 334. Ball bearings 326 roll between the grooves 332, 334, providing the only contact between the nut 322 and the screw 324. As the screw 324 rotates, the balls 326 may be deflected by a deflector 328 into a ball return path 330 of the nut and they travel through the return system to the opposite end of the nut 322 in a continuous path. Alternative embodiments of ball screw systems and ball returns are well known and commercially available. Any suitable embodiment will suffice. In the embodiment shown in FIG. 24, the balls 326 exit from the ball return path 330 into the ball screw and nut thread raceways continuously to recirculate in a closed circuit.

One end of the screw 324 is connected to gear 336, which is connected through shaft 314 to gear box 317. Gear box 317 may be any suitable system of gears and bevels, such as planetary gears (not shown) with suitable gear ratios to convert the rotation of gear 311 operatively connected to the drive shaft of motor 315 to cause the rotation of the screw 324. Rotation of screw 324 is translated to linear motion of the nut 322 as the balls 326 roll within the groove raceways, moving nut 322 up and down the screw 314. The outer section 316 of block 306 has a first side 354 positioned on the exterior of and facing the housing 308, spaced therefrom a sufficient distance to allow unhindered travel of the outer section 316 up and down along the length of housing 303 as nut 322 is moved along screw 324. The spacing may be just a slight air gap, or there may be no spacing, and instead, a low friction contact surface (for example, a polished metal surface or a lubricated surface) between the housing 308 and outer block section 316. Outer section 316, inner section 318 and nut 322 may be integrally formed from a single metal piece or may be formed from separate sections welded or otherwise rigidly joined together.

Figure 30:
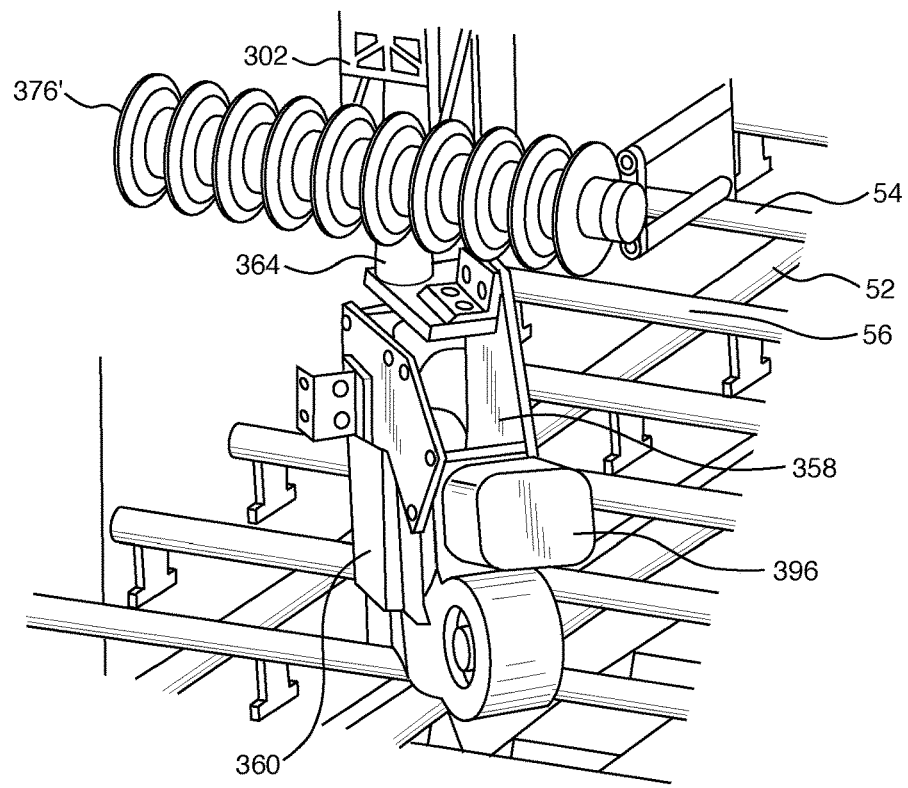
FIG. 30 is a perspective view of an embodiment of a tool mount and tool in the tool actuation subassembly.
Figure 31:
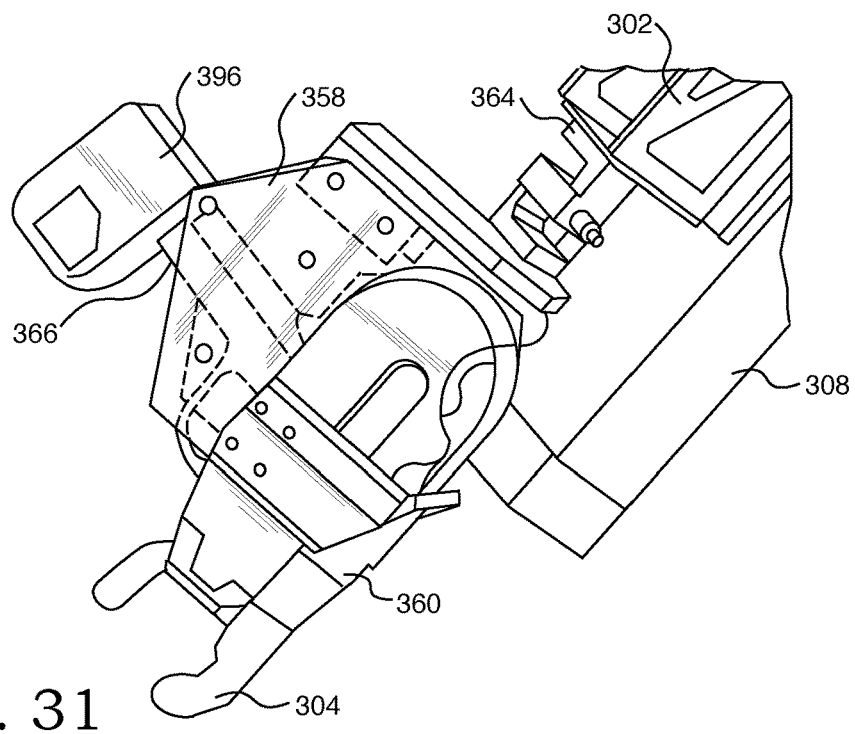
FIG. 31 is a view of the tool of FIG. 30.
Figure 32:
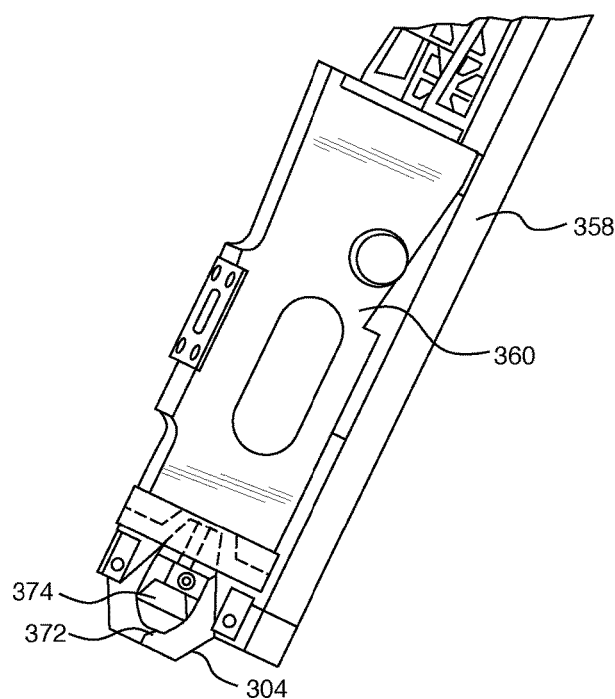
FIG. 32 is a view of an embodiment of a tool mounted to the end of the actuation subassembly.

Outer section 316 of block 306 includes a second side 356 facing away from housing 308. Rigidly attached to the second side 356 is a frame member 302. At the bottom end 362 of frame member 302, there is a rotatable connector 364 and a cradle 358 mounted on and extending downwardly from the connector 364 for seating a tool 360 having an end-effector 304. In the embodiments described herein, the tool 360 may be a wire tie or clip gun for tying wire or clamping clips around rebar intersections 56. Exemplary tools 360 are shown in FIGS. 30-32.

As described above, the tool actuator subassembly 300 is mounted to the carriage 202 using passive alignment mechanics to ensure greater travel with lower in-plane force to ensure greater reliability. FIGS. 13 and 16 show the top flex plate 208 and FIGS. 13 and 17 shows the bottom flex plate 210. The flex plates 208, 210 enable the entire tool actuator stage (housing 308, block 306, frame 302, cradle 358, and tool 360) to self-align to the engaged intersection 56 within an anticipated 0.5 inch accuracy. As shown in FIG. 13, top flex plate 208 is connected to housing 308 through bracket 207. Additional fasteners 398, such as bolts or screws, may be used to secure top plate 208 and bottom plate 210 to carriage 202.

In various aspects, the tool 360 may be releasably mounted to the cradle 358 for rapid removal and replacement and to allow use of different types of tools to suit a given work environment. The tool electrical features may be modified to integrate tool power, trigger, and status with the autonomous assembly 10 to meet the ruggedness demanded by the outdoor environmental. Additionally, the tool may itself have a wire spool 376 to feed wire ties to the end-effector 304. In addition, an off board wire spool 376' may optionally be integrated in the actuation subassembly 300 to increase the number of ties available between reloads.

Commercially available tools 360, adapted to be attached to cradle 358 and wired through releasable electric connections to electrical controls in electronics box 204 may be used. Alternatively, the tool 360 may be operated via remote control by RF waves or other suitable known control systems. FIGS. 30 and 31 show one embodiment of a tool 360 mounted in cradle 358. This tool 360 is adapted from a hand-held tool gun having handle 366, on-integral battery 396, and tool body 368. Tool 360 includes end-effectors 304, which as shown, include jaws for engaging the rebar 52 or 54 or intersection 56. The jaws open exposing recessed area 374 into which a rebar intersection 56 will fit. An alternative tool 360 is shown in FIG. 32.

In those embodiments where the assembly 10 and end-effector may be used to tie or clip rebar, it may be useful to include features that protect the rebar surface from damage by contact with the end-effector. To that end, a tool end-effector-to-rebar interface foot 370 may be provided in various aspects, to engage the rebar 52 or 54, in advance of the end-effector 304, and transfer any misalignment forces into the passive alignment features provided by flex plates 208, 210.

Figure 33:
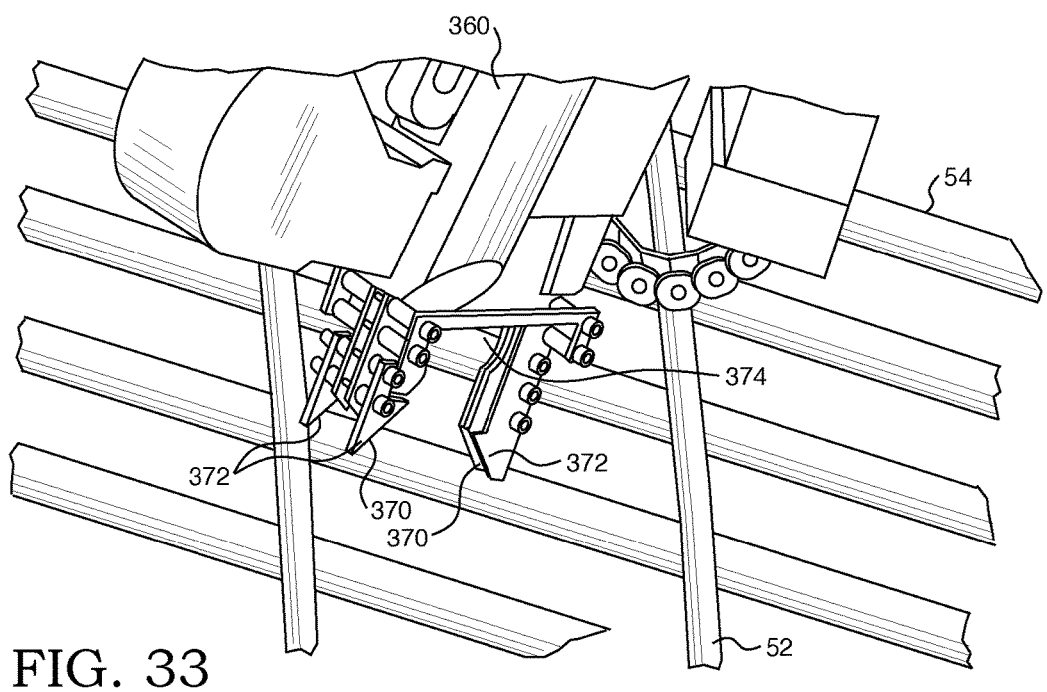
FIG. 33 illustrates an embodiment of an alignment component for aligning the tool with the desired site for tool use.
Figure 34:
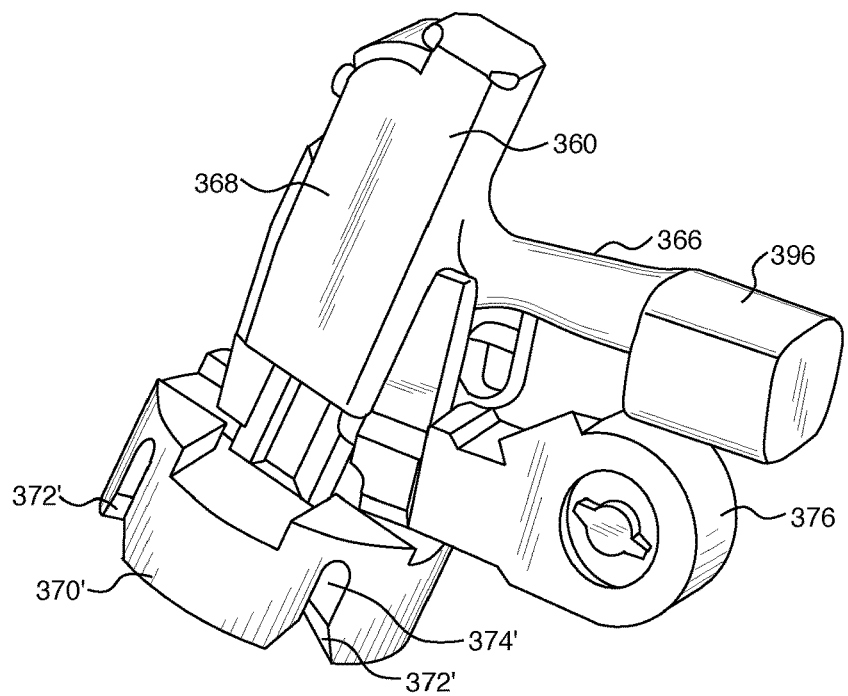
FIG. 34 illustrates a side perspective view of an exemplary tool and an alternative embodiment of the alignment components for aligning the tool with the desired site for tool use.
Figure 35:
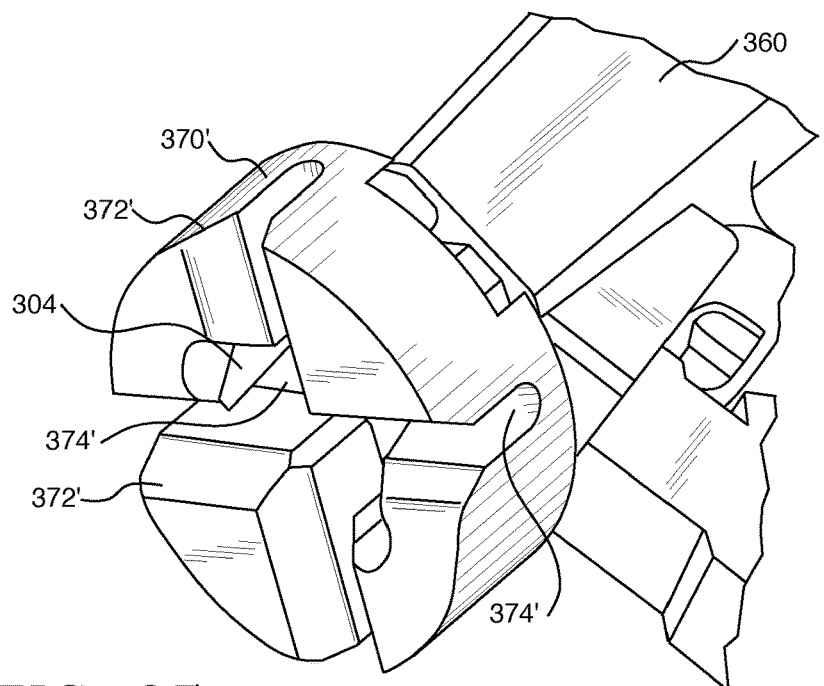
FIG. 35 is a bottom perspective view of the alignment component of FIG. 34.

One embodiment of a tool end-effector-to-rebar interface foot 370 is shown in FIG. 33. An alternative embodiment of an interface foot 370' is shown in FIGS. 34-36. In each embodiment, the interface foot 370 or 370' may optionally be mounted to the end of the tool 360 and may be constructed of a solid slippery soft plastic material, with no sharp edges, protecting the rebar epoxy coating from damage and preventing the interface foot from getting stuck on unexpected geometry. The foot 370 or 370' includes, respectively, a ramp 372 or 372' and recesses 374 and 374' configured to engage the rebar 52 or 54. The recesses are wider at the outside than in the center to allow the foot 370 or 370' to adjust position in the event that the rebar isn't precisely aligned with the recess 374 or 374'. The ramp 372 or 372' causes the rebar to slide into the recess 374 or 374', or causes the end-effector mechanism to flex around the rebar (made possible, at least in part, by flex plates 208 and 210), thereby protecting the rebar coating. The embodiment shown in FIGS. 34-36 includes two crossed recesses 374', sized to accept a small range of rebar sized (e.g. #5 & #6) with a small clearance around the larger size. The recess width gradually decreases as the foot 370' engages the rebar intersection 56 more fully, gradually centering the wire tie gun 360 on the intersection 56. Several optional interchangeable versions of the interface feet 370 and 370' may be fabricated to interface with the variations in specific rebar sizes, mat height, and geometry for a specific rebar mats 50.

The wire tie gun cradle 358 may include a force feedback safety sensor arrangement. The force feedback sensors may be positioned between frame 302 and cradle 358, or may be positioned in connector 364 to provide real time signals to the motion control software enabling over-force-limit motion stop protections to prevent damage due to impacting unrecognized obstacles, thereby improving system reliability in field conditions. Force feedback sensors are commercially available and any suitable sensor will suffice.

Remote Controller

The on-site operator may control the assembly 10 and the subassemblies 100, 200 and 300 remotely using any suitable commercially available or specifically designed controller 380, such as a safety rated radio controller selected from a large market of outdoor, industrial and construction radio controllers. An exemplary controller 380 is shown in FIG. 37. The controller 380 includes hand grips 392 and multiple joy sticks 384 for controlling the gantry and carrier subassembly motion and toggle switches 390 for targeted control of power to the end-effector and the tool. A screen 394 may be provided for display of data or other information relayed by the computer. The controller 380 may be used to trigger limited manual control of any of the subassemblies or to trigger automatic operation of the assembly 10 through mode selection knob 391. The assembly may be stopped quickly by activation of emergency stop button 393.

The controller 380 may be non-tethered (i.e. wireless) and battery operated. The controller 380 may include a remote emergency-stop function, manual robot mode control (i.e. manual or autonomous mode), manual axes jog control (i.e. 3-axis joysticks, not shown), and may have the ability to display human readable status and other messages to facilitate operations. Additionally, a separate remote emergency stop controller 382, as shown in FIG. 38, may be manned by a secondary worker on the work site, such as an operator or supervisor. Emergency stop controller 382 may include an antenna 388, a single emergency stop push button 386, and combination body and hand grip 378.

An antenna 282 (see for example, FIG. 4) on one of the electronics boxes 160 or 204 sends and receives signals to and from the controllers 380 and 382. The antenna 282 is wired into one or both computers 190 and 214 to read and react to manual control signals from controller 380 and motion stop signals from the controller 382, and to send status data back to the controller 380 for display on screen 394 in human readable form.

Software Systems

Figure 39:
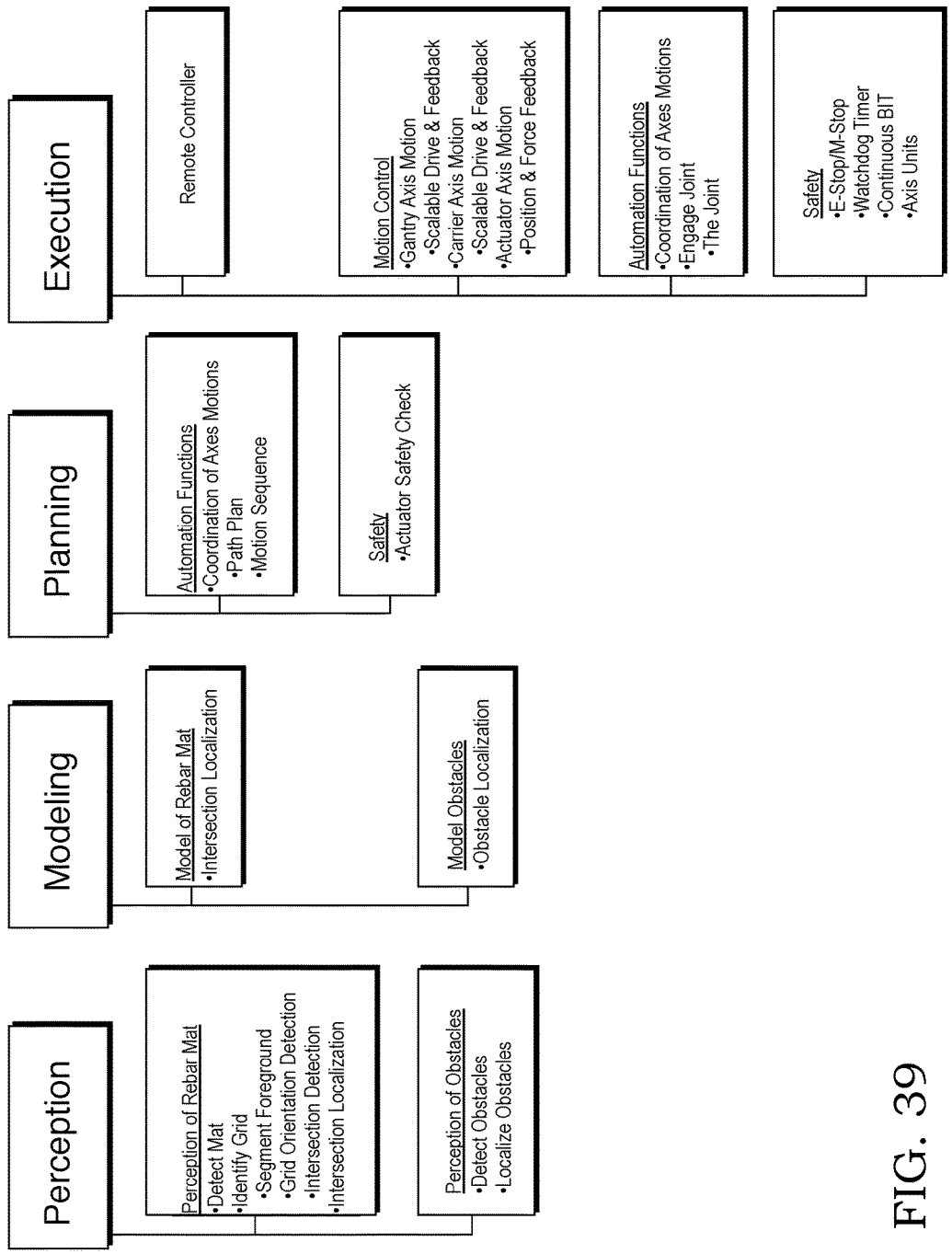
FIG. 39 is a chart summarizing the primary functions of the software controlling the autonomous operation of the apparatus.

The autonomous assembly 10 in various aspects may include software systems for operational control of assembly and subassembly functions. Referring to FIG. 39, there are four main functions performed by the system software: perception, modeling, planning, and execution. The perception function, certain aspects of which are described above in connection with the perception sensors, such as stereo cameras 342, perceives through the cameras 342, the rebar mat 50 (or other work site of interest). The images are communicated from the cameras to the computer 214 to detect the mat, identify the relevant grid, and localize the rebar intersections 56. The relevant grid may be identified in three steps, by segmenting the foreground, detecting the grid orientation, and detecting the intersections. The perception system also perceives obstacles, if any, that might be on the rebar mat by detecting the obstacles above or below the grid and localizing the obstacles.

The modeling function maintains a model of the rebar map by saving the perceived intersection and obstacle location data and, as the assembly moves and more images are processed, constructs a rebar, or work site, grid map, including intersection 56 localizations. The locations of detected obstacles are also saved on the developing grid map.

The planning function includes autonomous functions and safety functions. The autonomous functions include coordinating the three axes of motion along the first, second, and third paths. The periodic or continuous safety monitoring of the three subassemblies allows a payload monitor module to halt operations completely or at least to skip an intersection 56 for use of the tool in response to a condition deemed to be unsafe, such as an obstacle detected in the way of the end-effector at an intersection 56. The execution function includes an interface with the human-operated remote controller 380, motion control of the three main axes: gantry, carrier and tool actuation, automation functions, including coordination of axes motion and engagement of rebar intersections 56, and safety functions, including emergency stop mechanisms, a watchdog timer, continuous built-in-testing and monitoring of each of the subassembly units. Built-in-testing provides a safety function by checking that all communication features are functioning and that certain physical connections are intact.

The motion control functionality maintains motion control accuracy over the non-linear longitudinal gantry axis path (i.e., the first path) over travel distances, in various aspects, up to approximately 700 feet or more. The perception system software provided for the assembly 10 may be used to improve system reliability by improving intersection detection, detecting and rejecting intersections blocked by in-mat 50 obstacles, and detecting and rejecting intersections 56 which are too close together to be properly engaged by the interface foot 370 or 370'. In addition, the software may include features for improving the system productivity by controlling the motion control step & settle speed, increasing the speed in real time in response to work surface conditions where appropriate. A double-raster motion planning algorithm, enabled by the dual stereo camera sensors, may be included in various embodiments, contributing to the productivity and reliability of the assembly operations.

The software may also incorporate incipient crowded field safety functions, such as utilizing real time force feedback on the tool actuator axis to limit the applied force under the end-effector to eliminate any toe safety hazards; providing a dual watchdog timer to ensure that any software or hardware failure of the carrier subassembly 200 master computer 216, the gantry slave computer 190, or the communication link between them will trigger an emergency-stop of the assembly 10. Proximity sensors may be incorporated based on a motion stop response for the gantry and carrier axes subassemblies 100, 200, as well as incident camera logging of video surrounding any motion or emergency stop fault events.

Figure 40:
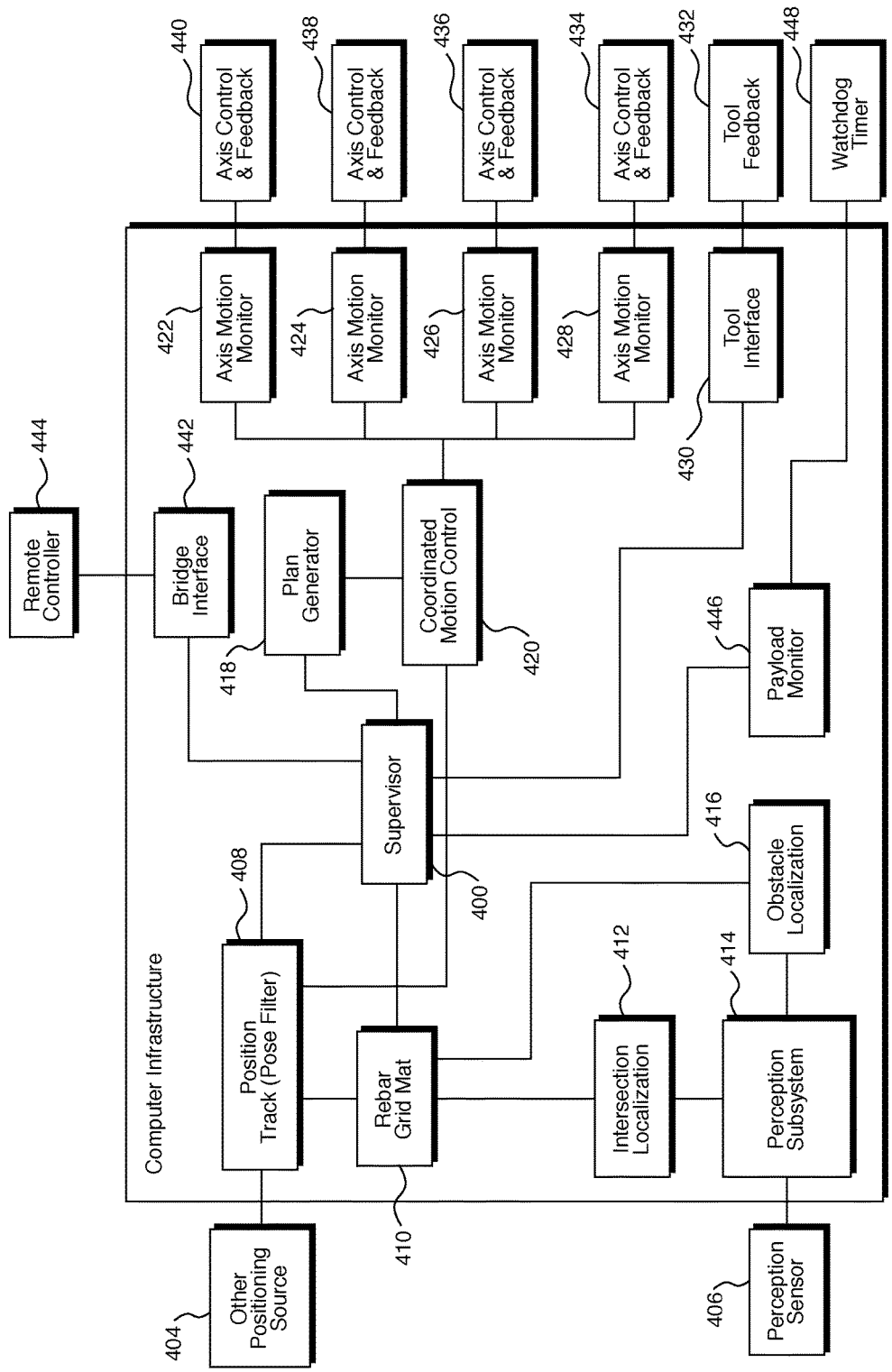
FIG. 40 is a flow diagram showing various modules that perform the functions for autonomous operation of the apparatus.

A more detailed overview of the software architecture for operating the assembly 10 is shown in the diagram in FIG. 40. The software is organized in a number of modules that communicate, or send and receive data, from each other. At the center of the navigation infrastructure system is a supervisor 400, which acts as an intersection that receives data from various sources and passes the data to different modules. The supervisor 400 coordinates actions between the various modules and is responsible for maintaining the state of the entire assembly. The navigation infrastructure includes a position tracking module 408 that is responsible for maintaining the current transform network and reporting where components of the assembly 10 are at any given time based on feedback from the various positioning sources. The position tracker module 408 receives data from various positioning sources, such as the gantry idler wheels 152 and carrier idler wheels 254, and from a rebar grid map module 410. Feedback from the idler wheels 152 provide data for correction of the drive wheel 150 positions to match the absolute position provided by the idler wheel feedback.

A perception subsystem module 414 that receives data from stereo camera modules 406 communicates the data to intersection localization module 412. Intersection localization module 412 detects the occurrence of intersections and reports the information (i.e., there either is or is not a rebar intersection 56 at a particular location) to the grid map module 410. The primary goal of the perception subsystem in various aspects, is to identify and locate rebar intersections on the gird map.

In use, the stereo cameras 342 capture the image within the fields of view 290 and 292 below each camera 342 at the same time and each sends the image data through a video processor which identifies features in the image, determines the distance between the two images and how far the cameras and the features in the images have moved since the prior images. The software triangulates the data to provide a three dimensional (3-D) view of the target site and its surroundings. The 3-D images are processed by range segmentation. That is, the software only "sees" images, or the points in the space, within a range of pre-selected planes and cancels out all features outside of that range. The image in the pre-selected range is flattened to a two-dimensional image to identify the features of a specific site of operation, such as the rebar intersection 56.

The calculations are made using a Hough transform algorithm, and preferably a Hough line transform algorithm. The Hough transform is well known to those skilled in the art and is derived from work by Paul Hough (see U.S. Pat. No. 3,069,654), expanded to identify positions of arbitrary shapes (see Duda, R. O. and P. E. Hart, "Use of the Hough Transformation to Detect Lines and Curves in Pictures," Comm. ACM, Vol. 15, pp. 11-0.15 (January, 1972)), and later applied to computer vision (see D. H. Ballard, "Generalizing the Hough Transform to Detect Arbitrary Shapes", Pattern Recognition, Vol. 13, No. 2, p. 111-122, 1981). In general, it is a feature extraction technique used in image analysis, computer vision, and digital image processing. The technique uses a voting procedure to find imperfect instances of objects within a certain class of preselected shapes retained in the software memory. The voting procedure is carried out in the pre-selected range of space, from which object candidates are obtained as local maxima in a so-called accumulator space that is explicitly constructed by the algorithm for computing the Hough transform.

In various aspects, the Hough transformation may be used to determine the most likely lines in the perceived image, then locate where those lines intersect within the image. A check is done to determine if rebar is present at the intersection location in the collapsed image. In the next step, a vote is taken on whether there have been a sufficient number of independent identifications on an intersection in a particular region before the intersection location is reported.

The linear Hough transform algorithm uses a two-dimensional array, called an accumulator, to detect the existence of a line described by $r = x \cos \theta + y \sin \theta$. The dimension of the accumulator equals the number of unknown parameters, i.e., two, considering quantized values of r and $\theta$ in the pair (r, $\theta$). For each pixel at (x, y) and its neighborhood, the Hough transform algorithm determines if there is enough evidence of a straight line at that pixel. If so, it will calculate the parameters (r, $\theta$) of that line, and then look for the accumulator's bin that the parameters fall into, and increment the value of that bin. By finding the bins with the highest values, typically by looking for local maxima in the accumulator space, the most likely lines can be extracted, and their (approximate) geometric definitions read off. The simplest way of finding these peaks is by applying some form of threshold, for example, determining which lines are found as well as how many. Since the lines returned do not contain any length information, it is often necessary, in the next step, to find which parts of the image match up with which lines. The final result of the linear Hough transform is a two-dimensional array (matrix) similar to the accumulator. In one dimension of the matrix is the quantized angle $\theta$ and in the other dimension is the quantized distance r. Each element of the matrix has a value equal to the sum of the points or pixels that are positioned on the line represented by quantized parameters (r, $\theta$). So the element with the highest value indicates the straight line that is most represented in the input image.

The final result of the linear Hough transform is a two-dimensional array (matrix) similar to the accumulator—one dimension of this matrix is the quantized angle $\theta$ and the other dimension is the quantized distance r. Each element of the matrix has a value equal to the sum of the points or pixels that are positioned on the line represented by quantized parameters (r, $\theta$). So the element with the highest value indicates the straight line that is most represented in the input image. Calculations for circles, ellipses and other shapes are also well known in the literature. See Duda and Hart, Comm. ACM (1972) supra. The camera image data is communicated to computer 214 where perception system software, including modules for carrying out the Hough and other suitable computer visions processing algorithms, are located.

Although the Hough transform has been described as an exemplary methods, those skilled in the art will recognize that other algorithms may be used to identify and localize intersections from three dimensional data.

The perception subsystem can detect disparities in the images generated by the multisense data and translate the images into a three dimensional point cloud. The generated point cloud can be segmented to isolate the rebar mat 50 from the surrounding environment. A Hough transform, described above, is performed on the collapsed representation of the threshold point cloud in order to determine intersection locations. The perception subsystem may also validate intersections based upon a generated confidence value and image representing the location of actual rebar. The intersection locations detected by the perception subsystem are reported to the rebar grid map module 410 to add to the current and developing map of the rebar intersections 56.

Figure 41:
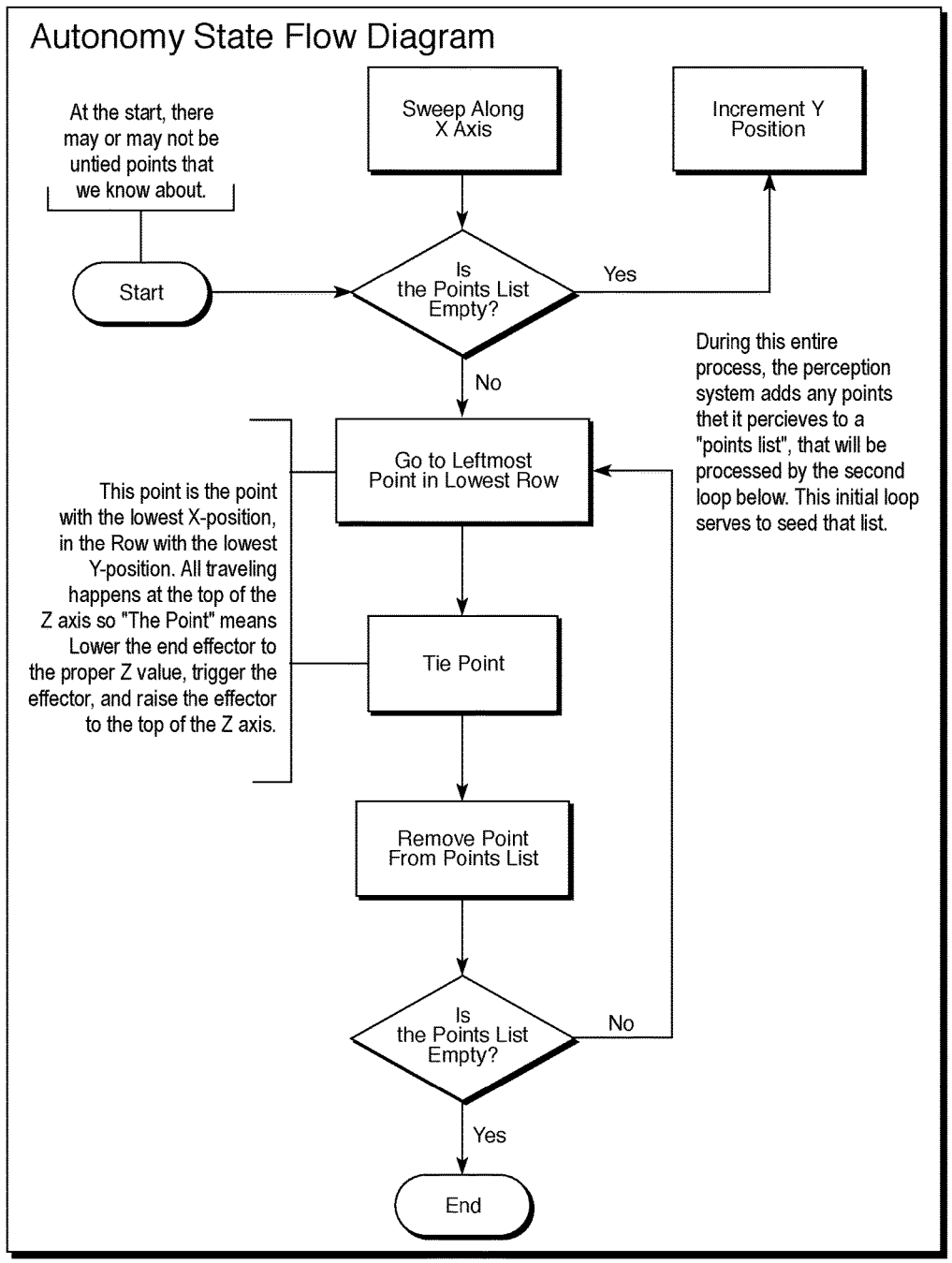
FIG. 41 is a flow diagram showing the steps for generating and updating the grid map module of the software of the apparatus.
Figure 42:
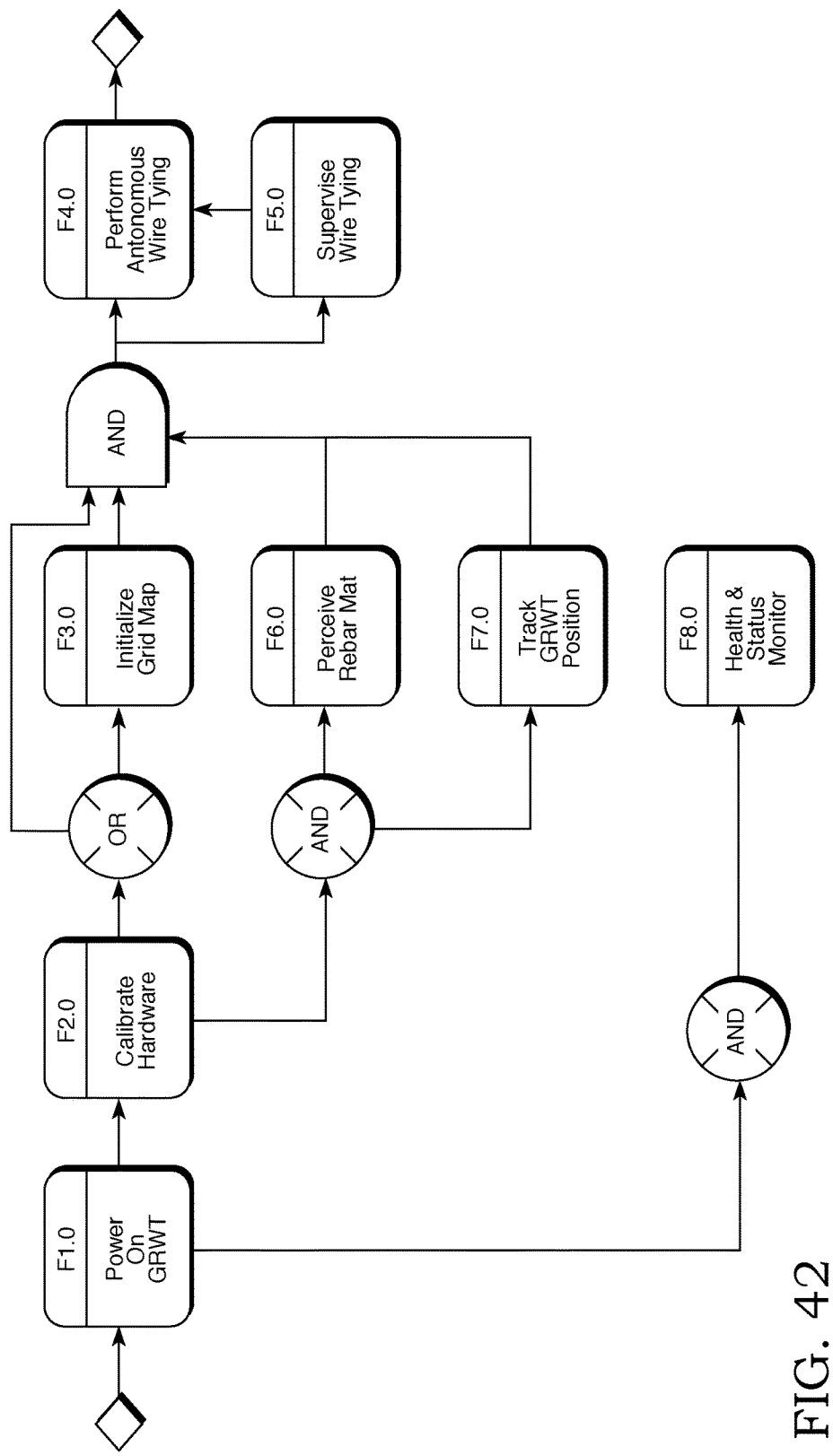
FIG. 42 is a flow diagram of certain of the steps taken in the operation of the apparatus.

The grid map is a dynamic data structure that adds and stores information to the grid map as image data is received and analyzed. The grid map maintains a list of the location of all of the tied and untied intersections 56 within the field of view of the stereo cameras 342 communicated via module 406 to the perception subsystem 414. Referring to FIG. 41, a flow diagram is provided to show one way in which the grid map may be created. Those skilled in the art will recognize that there are, and be able to program, other ways of iterating through the perception construction map to track points of interest for the end-effector function. At the start, there may be intersections that have been tied by hand and many more that will not have been tied. The camera 342 will sweep along the X axis, viewing the rebar images in the longitudinal direction and collect data points. The color perception sensors may identify intersections that have already been tied to eliminate duplicate tying. However, duplicate tying at occasional intersections is acceptable. If the points, or intersection list is empty, the cameras will be instructed to take incremental rebar images along the Y axis in the direction of the lateral rebar 54. During this process the perception subsystem adds points that it perceives to the points list. The initial camera passes serve to seed the point list of the grid map module 410.

The perception subsystem 414 also interprets image data to detect disparities in the images using a point cloud segmentation technique to limit the points of interest to desired planes in a pre-selected field to compress and maximize the image space. The observed disparity data is communicated to an obstacle localization module 416 that uses the data to calculate the likely presence of obstacles in the intersections or in any of the three paths or axes of travel. The obstacle localization data is communicated to the rebar map grid 410 to update the map with new grid data. The intersection locations and data generated to create a grid map are communicated to the position tracker subsystem 408. Data from the rebar grid map module 410 is also communicated to the supervisor 400 for redirection to other modules as needed. To detect obstacles, the system identifies a location where an intersection is expected to be based on actual observed and calculated rebar locations. To verify the intersection, a current image is communicated and if the current image doesn't match the expected image of a rebar intersection, the system will deem the unexpected image to be an obstacle. The presence of a deemed obstacle will be communicated through the supervisor 400 to the coordinated motion control module 420.

The supervisor module 400 activates a path planner function in the plan generator module 419. The plan generator is responsible for generating plans, such as got to point A or point B, which are then refined by evaluating factors such as obstacles into the plan. The plan generator 418 receives data from the supervisor 400 regarding the grid map and determines where the subassembly motion axes go. The plan generator checks data from the grid map module, received through the position track module 408 through the supervisor 400 to locate, for example, the next intersection 56 and ask whether there is an obstacle there. If there is an intersection 56 and no obstacle, the plan generator module 419 will send a path plan to the coordinated motion control module 420 to go to the next intersection location on the grid map.

One approach to sequencing the points within the grid map is when the points list in the grid map is not empty. When the list includes data points to define intersections that need to be tied, the system will read the grid map going, for example, to the leftmost point in the lowest row in the grid (and by implication, on the actual rebar mat 50). The point here is the point with the lowest X-axis position, in the row with the lowest Y-axis position, which should correspond to the closest rebar intersection 56. All traveling happens at the top of the Z-axis so the point means to lower the end-effector 304 to the proper position along the Z-axis, where the end-effector 304 will be triggered to place a tie from the tie spool 376 into the opening of the jaws of the tool to tie the intersection above which the jaws are positioned. After the intersection is tied, the end-effector is raised to a higher location on the Z-axis and the point of that just tied intersection is removed from the points list in the grid map. The planner will check the grid map list and ask if the list is empty. If not, the next point (again, the lowest in the X/Y-position on the points list) will be tied. If the points list is empty, the cameras will be directed to sweep along the X and Y-axes, as before to populate the list of intersection points in the grid map.

The coordinated motion control module 420 monitors the status of the multiple axes and reports back to the supervisor 400 if any faults occur. The coordinated motion control module 420 is responsible for executing motion plans communicated to it as multiple points by the plan generator module 418. The coordinated motion control module 420 receives data from the position tracker module 408 to calculate the current location of the three X, Y, Z axes (the truss position along the longitudinal, typically non-linear first path, the carriage position along the laterally directed generally horizontal second path, and the tool position along the vertical third path) and determines where on the grid map to go next, then calculates the distance each axis must travel to reach the next planned location.

After checking back with the position tracking module 408 to make sure the three axes are where they are supposed to be and making adjustments based on the current location data, the distance, if any, that each axis needs to travel along its respective path to reach the next planned intersection 56 is communicated to the axis motion monitors 422, 424, 426, 428 and through them to the axis control and feedback modules 432, 434, 436, 438 and 440. Each axis motion monitor translates motion instructions from the coordinated motion control module 420 to the axis control and feedback modules, which are wired to the motion control amplifiers 240 near the drive motors. The software instructs the motion control amplifiers which convert the current sent to one or more of the drive motors 184 and 226. There is also a tool interface module 430 to receive feedback data from the tool feedback module 432 and direct that information back to the supervisor 400. The supervisor 400 instructs the tool interface, for example, a tie gun or clip gun interface, to tie/clip or not to tie/clip. Alternatively, a coordinated control module 420 may perform this function through point action.

The supervisor 400 is also connected for data transmission to a bridge interface 442 that receives signals from the remote controller 444. A payload monitor 446 is connected for data transmission to a watch dog timer 448 and back to supervisor 400. The payload monitor sends out pulses and the watchdog timer 448 listens for the pulses. If the watchdog timer 448 does not receive a pulse then it cuts power to the motion control amplifiers within a short time, for example, less than 100 milliseconds. Thus, the watchdog timer is watching the system software and acts to 'save' the system in the event of a software failure.

The payload monitor module 446 monitors the overall health and status of the assembly 10 and reports any errors or faults to the supervisor module 400. The payload monitor module 446 may function by sending pulsed signals to the supervisor 400, which sends the signals on to the modules for other components to determine if the components are working. A working component will send a reply signal to the supervisor. A failed component will not. In the event of a failure to receive a reply signal, power to the motion control systems will be cut.

The perception module takes in images from the perception sensor 340 and extracts three dimensional images from it in the form of a point cloud. The point cloud is then segmented to select only points in the plane of the rebar grid. The segmented point cloud is then used to detects and localize intersections 412 and to detect and localize other objects, e.g., obstacles, 416 from the given perception sensor image frame.

In various aspects, a second method of intersection detection may be added. This feature enables a two-factor evaluation of a specific intersection, reducing false positive intersections and improving system reliability. An in-mat obstacle detection feature may be provided to enable avoidance of intersections which are too close to an in-mat obstacle, but which do not themselves have an obstacle in the way of the intersection. The perception software evaluates and avoids intersections which may be too close to one another, effectively blocking the tool interface foot 370 or 370'. To improve system robustness to small motions of the rebar in the mat during operation (due to robot or operator actions), the software may be designed to favor more recent intersection detections over older detections to maintain intersection position accuracy after an intersection has moved.

Rebar mat 50 perception may implement color perception sensors 340 enabling more reliable and accurate intersection 56 identification and localization. For example, with color sensors, already tied intersections may be detected based on the wire tie color. Automatic detection and real-time adjustment of the perception sensors 340 to rebar mat 50 plane orientation parameters may be applied to enable robust intersection detection over a cambered mat. The perception system preferably quickly performs end effector-to-stereo camera calibrations, ensuring robust and productive operation in the field between tool changes. Active illumination controls may be provided to enable effective intersection perception in the dark, such as at night, on very overcast days, or for use in tunnels and other areas where natural light may be blocked.

A gantry steering model may be utilized to enable adjustment of the gantry leg 104 drive speeds to closely follow the immediate curvature of the screed rails 58. Each side of the gantry subassembly 100 may be independently driven. This may be directed by a rail following sensor (not shown but optionally positioned on the idler wheels 152), detecting the relative curvature of each rail 58. In addition, or in the alternative, cameras may be provided directed ahead of the gantry subassembly 100 to provide advance images of the curvature of the rails 58 or other marker. The advance image data is reported to the supervisor 400 and coordinated with the plan generator module 418 to adjust the motion control instructions through modules 438 and 440 to the drive motors 184 to effect different motions for each drive motor 184. The distance of travel for the drive wheel 150 on one side of truss 102 on the outside of the curve will be greater than the distance of travel for the drive wheel 150 on the other side of truss 102 on the inside of the curve. The software is written to recognize the difference between rebar lines and the rail lines to accurately identify and calculate the curvature of the rails.

Alternatively, a time-of-flight camera may be mounted on the legs 104 or a forward facing section of the truss 102 or support frame 106 for sending out laser pulses, receiving feedback and communicating the data to the supervisor 400 for adjustment of the motion control instructions in the manner described above.

In another alternative embodiment, rail curvature may be observed using perception sensors 340. The sensors 340, such as stereo cameras 342, communicate images within their fields of view to the perception subsystem module 414 which uses the algorithm discussed above to identify lines and angles within the field of view and compare the images to the grid map data for the longitudinal rebar 52 lines. When moving at small increments, the changing curvature can be measured. The assumption may be made that the rebar follows the screed rail so the curvature of the longitudinal rebar lines will be close to the curvature of the screed rail 58. Those changes can be used to adjust the motion instructions from the motion control subsystem modules to the drive motors 184 and drive wheels 150 on the gantry legs 104. A global positioning system (GPS) unit may be employed to adjust for the gantry truss location relative to the rebar.

The tool position tracking functions, in various aspects, may include automatic slip corrections based on the idler encoder feedback, for example, through module 404. GPS sensor feedback may in various aspects, be integrated to maintain correlation between the grid map positions before and after software restart actions (i.e. shift changes). All of these sensor inputs will be collected together in the grid map via a position tracking filter module 408.

Safety of the assembly may be enhanced by implementing a dual watchdog safety timer on the gantry and carrier axes. The safety timers would each be continually reset by the computers 190 and 214. If the computer hardware, software or data communication link fails for any reason, the watchdog timers will remove power from the robot motion control preventing any unwanted motion. This dual safety precaution ensures safe operation enabling a wireless Ethernet data link between the gantry and carrier axes and eliminating dynamic cable reliability (e.g. intermittent shorts) risks.

The software fault handling functionality may optionally be enhanced by advancing the health and status monitor functionality. Additional start-up hardware checks, operational performance checks, and user initiated status checks may be implemented to ensure rapid identification and localization of faulty hardware, connections or subsystems to facilitate reliable trouble shooting of error conditions in the field.

FIG. 45 shows schematically the functional flow of the system. After the assembly is powered on, the monitoring of the health and status by the payload monitor module 446 of all of the assembly components begins and continues throughout operation of the assembly operations. At the start, the hardware is calibrated, the rebar mat is perceived, and the positions of the subassembly axes are tracked. Alternatively, the grid map may need to be initialized first, implementing the initialization procedures summarized in FIG. 44 to generate the points list of the rebar grid map. After the map is sufficiently populated to begin, the positions of the subassembly axes are tracked. In each case, the various system modules described above are employed to position the three axes and associated components to conduct the autonomous tying function. The tying function is monitored by a crew member who carries the remote controller and has the ability to stop and restart any action as needed, including directing the repositioning of the axes.

The assembly 10 and the software systems used to control its autonomous operation may be used in the following operations. In step one, the existing construction crew installs the screed rails 58 and lays out the bottom rebar mat 50 comprised of longitudinal and lateral rebar 52, 54. The crew manually ties about 10% of the intersections 56, including rebar overlap intersections. In step two, the assembly 10 is delivered to the job site and installed. The assembly 10 would typically arrive at the construction site in segments which are lifted by a crane into position at one end of the work site, for example, a road deck, and manually assembled by the existing construction crew under the supervision of the assembly operator. The height of the truss 102 over the road deck is adjusted by adjusting the position of the brackets 108 on legs 104 and support frame 106. The width of the truss 102 is also adjusted manually by aligning as many truss modules 118 as needed to allow the carriage 202 to traverse the full width of the mat 50 with the tool actuator axis subassembly 300 in a retracted position without impacting any obstructions on the road deck surface.

In step three, the assembly 10 ties the bottom mat 50 layer. The assembly operator performs an initialization of the assembly 10 to the mat 50 and then initiates continuous or intermittent tying operations. The operator initializes the assembly 10 by first positioning the gantry and carrier axes, via remote control, at the start of the mat 50. The operator then manually verifies or adjusts the tool actuator axis stroke to fully engage the mat 50 with appropriate force, setting the desired stroke.

The operator triggers an initial homing cycle, allowing the autonomous system to move the perception sensors 340 transversely and longitudinally over a small area of the mat 50 to establish the mat pattern relative to the autonomous system motion axes.

After the assembly 10 and systems are initialized to the mat 50, the operator initiates continuous tying operations. The assembly 10 utilizes the perception sensors 340 to detect and locate accessible rebar intersections 56 to tie. The assembly 10 moves the gantry and carrier axes subassemblies 100 and 200 to position the end-effector 304 over an accessible intersection 56. The assembly 10 extends the actuator axis frame 302 and attached tool to engage the rebar intersection 56 with the end-effector 304 and tie the intersection 56. If an error is detected in this process the error is reported to the operator. In this way the assembly 10 steps the carrier axis across the bridge deck tying all accessible intersections 56. When the lateral carrier axis (e.g., carriage 202) reaches the end, the longitudinal gantry axis (e.g., drive wheels 150 move legs 104 and thereby truss 102) steps forward to the next row of lateral rebar 54 and the carrier axis (e.g., carriage 202) proceeds to intersections 56 back across the work site, and the tool actuation axis (e.g., housing 308, frame 302, and tool 360) is lowered and raised to and away from each intersection 56 to perform the tying or other tool function as the lateral carrier axis incrementally moves to the next intersection in need of a tie and without any obstacle deemed to interfere with the tying operation.

During tying operations the assembly operator walks behind the assembly 10 at a safe distance, manually tying any intersections 56 the assembly found to be inaccessible.

The operator may at any time pause or stop the tying operation via the remote control unit 380 or 382. Periodically the operator may pause tying operations and reload the tie-wire spool 376. When the assembly 10 arrives at the far end of the road deck after it completes tying the bottom mat, the operator then powers down the assembly 10.

In step four, the existing construction crew lays out the top layer of rebar mat 50 and ties 10% of the intersections 56, including overlap intersections. In step-five, the operator powers up the assembly, initializes the assembly 10 to the top mat 50 and begins continuous tying operation, replicating step three. In the final step, the existing construction crew, under the supervision of the assembly operator, disassembles the assembly 10 and secures the subassembly components for transportation.

In summary, the various subassemblies may be manufactured and sold individually and may in various aspects be used with other assemblies. The various subassemblies may be therefore be characterized as follows.

The gantry subassembly may be described as an assembly comprising a bridge member for laterally spanning, in use, a selected section of a work site, the bridge member having a first end and a second end; at least one, and preferably a pair of legs at each of the first and second ends of the bridge member, each leg having an upper portion and a lower portion; a drive system for effecting travel of the assembly along a path of the selected section of the work site; and, an autonomous control system for controlling the drive system. The gantry assembly control system may comprise a perception subsystem, a motion planning subsystem, and a motion control subsystem. The gantry assembly control system may further comprise a computer operatively connected for at least one of wired or wireless communication and control to the drive system. The gantry assembly may also include perception sensors, such as a pair of stereo vision cameras, connected for at least one of wired or wireless communication to the control system, the perception sensors being positioned for taking and communicating images to the control system for processing by the perception subsystem. The perception subsystem may calculate from the images communicated by the perception sensors the direction of the path and communicates the direction to the motion planning subsystem, which calculates and communicates travel instructions comprised of the direction, extent and speed of travel of the drive system for effecting the calculated travel instructions by control of the drive motor. The gantry assembly may further include at least one support frame positioned at one of the first and second ends of the bridge member, where the at least one support frame is adjustably mounted to one of the legs, or pair of legs, for selectively altering one or both of the lateral and elevational positions of the support frame relative to the pair of legs to which the support frame is attached. The bridge member may be adjustably mounted to each leg, or each of the pairs of legs, for selectively altering the elevation of the bridge member relative to the pair of legs. There may be two support frames, the first support frame being positioned at the first end of the bridge member and the second support frame being positioned at the second end of the bridge member. Each of the first and second support frames may be adjustably mounted, respectively, to the first and second legs or pair of legs for selectively altering one or both of the lateral and elevational positions of the support frame relative to the legs to which the support frame is attached; and the bridge member may be connected at the first end thereof to the first support frame and at the second end thereof to the second support frame. Each of the legs or pair of legs of the bridge member may be operatively connected at the lower portion thereof to the drive system, and the drive system may comprise at least one drive motor, at least one drive wheel operatively connected to each leg or pair of legs and to the at least one drive motor. Two brace members may be provided, one brace member being rigidly connected to the lower portion of each leg or each of the pair of legs at the first end of the bridge member and one brace member being connected to the lower portion of each leg or each of the pair of legs at the second end of the bridge member. At least one rotational effector may be positioned between each brace member and the at least one drive wheel of each leg or pair of legs for effecting rotational motion of each drive wheel relative to each pair of legs. The drive system may also include an idler wheel rotationally connected to each brace member, at least one rotational effector positioned between each brace member and the at least one idler wheel of each pair of legs for effecting rotational motion of each idler wheel relative to each pair of legs, and, at least one encoder mounted to each idler wheel for measuring motion parameters of the drive wheel. Each of the drive wheels and idler wheels may be configured to travel on rails which, in use, define the path along each side of the selected work site. Alternatively, each of the drive wheels and idler wheels may be configured to travel on ground. The path of travel may be one or both of linear and non-linear. A remote controller may be provided for wireless communication to the autonomous control system for selecting one of manual or automatic control of the bridge member drive motor and control system.

The carrier subassembly may be described as an assembly comprising a carrier movably mounted to a gantry, where the carrier has a drive system for effecting travel of the carrier along a path along the span of the gantry, and, an autonomous control system for controlling the motion of the carrier along the path. The carrier assembly control system may comprise a perception subsystem, a motion planning subsystem, and a motion control subsystem. The control system may include a computer operatively connected for at least one of wired or wireless communication and control to the drive system. The carrier assembly may further include a pair of perception sensors, such as stereo vision cameras, connected for at least one of wired or wireless communication to the control system, the stereo cameras positioned for taking and communicating images to the control system for processing by the perception subsystem. The perception subsystem may calculate from the images communicated by the perception sensors the direction of the path and communicates the direction to the motion planning subsystem, which calculates and communicates travel instructions comprised of the direction, extent and speed of travel of the drive system for effecting the calculated travel instructions by control of the drive motor. The drive system may comprise a drive motor, and at least one pair of drive wheels operatively connected to the drive motor and configured for travel along the path. The carrier may further comprise a power source mounted thereon for powering the drive motor. The autonomous control system may comprise a computer mounted on the carrier operatively connected for wired or wireless communication and control to the drive system and the power source. The drive system may further comprise at least one and preferably two idler wheels. Each idler wheel may have at least one encoder mounted thereon for measuring motion parameters of the at least one drive wheel and communicating the measurements to the control system. The carrier assembly may include a remote controller for wireless communication to the control system for selecting one of manual or automatic control of the carrier and the drive system.

The tool actuator subassembly may be described as an assembly comprising a motion actuator, an end-effector operatively connected to the motion actuator, a drive system for effecting linear travel of the end-effector along the motion actuator, and an autonomous control system for controlling the linear travel and the operation of the end effector. The actuator control system may include a perception subsystem, a motion planning subsystem, and a motion control subsystem. The control system may include a computer operatively connected for wired or wireless communication and control to the drive system. The actuator assembly may further include perception sensors, such as a pair of stereo vision cameras, connected for wired or wireless communication to the control system. The perception sensors are positioned for taking and communicating images to the control system for processing by the perception subsystem. The actuator perception subsystem may calculate from the images communicated by the perception sensors the location of positions of interest on a work site for use of the end-effector, and may communicate the positions of interest to the motion planning subsystem, which calculates and communicates travel instructions comprised of the direction, extent and speed of travel of the actuator on the path to the motion control subsystem for effecting the calculated travel instructions by control of drive motor. The actuator assembly may further comprise a support member and at least one flexible support plate flexibly mounted to the support member for supporting the linear motion actuator, the flexible plate enabling the actuator to tilt in at least two degrees of freedom relative to the plane of the support member. The actuator drive system may include a power source, an assembly operatively connected to the power source for powering motion of the linear motion actuator, and a frame mounted for linear motion to the motion actuator. The frame has a lower end and a tool releasably mounted to the lower end of the frame, where the tool has the end effector positioned thereon. The motion actuator may be a linear motion actuator which may comprise a housing, having a longitudinal opening, a ball screw member positioned in the housing being comprised of an elongate screw, a plurality of ball bearings, and surrounded in part by a nut, the screw being connected on one end thereof to a gear assembly for effecting rotation of the screw. The screw may have helical grooves defining a spiral path in which the plurality of ball bearings travel between the screw and the nut as the screw is rotated in use by movement of the gear assembly, the ball bearings effecting linear motion of the nut along the length of the screw. A member may be provided that extends through the opening in the shaft and connects the nut to the frame so that movement of the nut effects linear movement of the frame and the tool. A remote controller may be provided for wireless communication to the autonomous control system for selecting one of manual or automatic control of the motion actuator, the end-effector, and the drive system.

The assembly, subassemblies, and systems and subsystems have been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The assembly, subassemblies, and systems and subsystems have been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. An autonomous assembly comprising:
   a gantry subassembly comprising a bridge member for laterally spanning, in use, a selected section of a work site, and a gantry drive system for effecting travel of the gantry subassembly along a first path of the selected section of the work site;
   a carrier subassembly movably mounted on the gantry subassembly and comprising a carriage and a carriage drive system for effecting travel of the carriage along a second path along the span of the bridge member;
   a tool actuation subassembly mounted on the carrier subassembly comprising a motion actuator, an end-effector operatively connected to the motion actuator, and an actuator drive system for effecting travel of the end-effector along a third path generally perpendicular to the second path; and,
   an autonomous control system comprising a perception subsystem configured to receive, interpret, and communicate data, a motion planning subsystem configured to receive data from at least the perception subsystem to calculate and communicate travel instructions comprised of one or more of direction, extent and speed of travel of one or more of the gantry subassembly, carrier subassembly, and tool actuation subassembly on the first, second and third paths, respectively, and a motion control subsystem configured to receive at least travel instructions from the motion planning subsystem and to effect the calculated travel instructions by operative control of the gantry drive system, the carriage drive system and the tool actuation drive system.

2. The assembly recited in claim 1 wherein the bridge member of the gantry subassembly further comprises:
   a plurality of modular sections, each section having a leading end and a trailing end; and,
   connectors for joining leading end of a module to the trailing end of an adjacent module for selectively extending the distance the bridge member spans the work site.

3. The assembly recited in claim 1 wherein the bridge member of the gantry subassembly further comprises:
   a plurality of extension members for extending the width of the bridge member.

4. The assembly recited in claim 1 wherein the bridge member of the gantry subassembly has a first end and a second end and comprises:
   a first support frame positioned at the first end of the bridge member and a second support frame positioned at the second end of the bridge member;
   at least two legs, one leg at each of the first and second ends of the bridge member, each leg having an upper portion and a lower portion;
   the first support frame being adjustably mounted to the upper portion of the first leg and the second support frame being adjustably mounted to the upper portion of the second leg for selectively altering the elevation of each support frames on each of the legs; and,
   a truss having a first end and a second end, the truss being connected at the first end from the first support frame and at the second end from the second support frame.

5. The assembly recited in claim 4 wherein each of the at least two legs of the bridge member is operatively connected at the lower portion thereof to the gantry drive system, and the gantry drive system comprises:
   at least one gantry drive motor;
   at least one gantry drive wheel operatively connected to each leg and to the at least one gantry drive motor.

6. The assembly recited in claim 5 further comprising:
   a pair of legs at each of the first and second ends of the truss;
   two brace members, one brace member being rigidly connected to the lower portion of each leg of the pair of legs at the first end of the bridge member and one brace member being connected to the lower portion of each leg of the pair of legs at the second end of the bridge member;
   at least one rotational effector positioned between each brace member and the at least one gantry drive wheel of each pair of legs for effecting rotational motion of each gantry drive wheel relative to each pair of legs.

7. The assembly recited in claim 6 further comprising a gantry idler wheel rotationally connected to each brace member; and
   at least one encoder mounted to each the gantry idler wheel for measuring motion parameters of the gantry drive wheel.

8. The assembly recited in claim 7 wherein each of the gantry drive wheels and gantry idler wheels are configured to travel on rails which, in use, define the path along each side of the selected work site.

9. The assembly recited in claim 7 wherein each of the gantry drive wheels and gantry idler wheels are configured to travel on ground.

10. The assembly recited in claim 4 wherein the truss comprises a plurality of modular sections, each section having a leading end and a trailing end; and,
    connectors for joining leading end of a module to the trailing end of an adjacent module for selectively extending the distance the bridge member spans the work site.

11. The assembly recited in claim 4 wherein the truss comprises a framework having longitudinal frame members for spanning, in use, the selected section of the work site and lateral frame members extending perpendicularly from the longitudinal frame members, and a plurality of extension members for increasing the lateral length of the lateral frame members, to thereby increase the width of the truss.

12. The assembly recited in claim 4 wherein the autonomous control system comprises at least one computer mounted to one of the first and second support frames, operatively connected for communication and control to the gantry drive system.

13. The assembly recited in claim 1 wherein the bridge member has a pair of rails spaced from each other and defining the second path, the carriage being mounted on the rails for travel along the second path.

14. The assembly recited in claim 13 wherein the carriage drive system comprises:
    a carriage drive motor; and,
    at least one pair of carriage drive wheels operatively connected to the carriage drive motor and configured for travel on the pair of bridge member rails; and,
    an axle connecting the at least one pair of carriage drive wheels.

15. The assembly recited in claim 14 wherein the carrier subassembly further comprises:
    a power source mounted on the carriage for powering the gantry drive motor and the carriage drive motor.

16. The assembly recited in claim 15 wherein the autonomous control system comprises at least one computer mounted on the carriage operatively connected for communication and control to the carriage drive system and the power source.

17. The assembly recited in claim 14 wherein the carriage drive system further comprises a motion sensor.

18. The assembly recited in claim 17 wherein the motion sensor comprises at least one encoder.

19. The assembly recited in claim 18 further comprising a pair of carriage idler wheels mounted to the carriage and each configured to ride on the bridge member rails.

20. The assembly recited in claim 19 wherein each carriage idler wheel has the at least one encoder mounted thereon for measuring motion parameters of the carriage drive wheels.

21. The assembly recited in claim 17 wherein the motion sensor comprises a global positioning system.

22. The assembly recited in claim 1 wherein the tool actuation subassembly further comprises:
    at least one flexible support plate flexibly mounted to the carriage for supporting the motion actuator, the flexible plate enabling the tool actuation subassembly to slide and to tilt in at least two degrees of freedom relative to the carriage.

23. The assembly recited in claim 1 wherein the first path is one or both of linear and non-linear.

24. The assembly recited in claim 1 wherein the actuator drive system of the tool actuation subassembly further comprises:
    an assembly operatively connected to a power source for powering motion of the motion actuator;
    a frame mounted for linear motion to the motion actuator, the frame having a lower end;

a tool releasably mounted to the lower end of the frame, the tool having the end effector positioned thereon.

25. The assembly recited in claim 24 wherein the motion actuator is selected from the group consisting of a linear motion actuator, a delta actuator, a parallel kinematic actuator, and combinations thereof.

26. The assembly recited in claim 25 wherein the linear motion actuator is selected from the group consisting of belt drive systems, hydraulic cylinders, geared mechanisms, and combinations thereof.

27. The assembly recited in claim 24 wherein the motion actuator is a linear motion actuator comprising:
   a housing having a longitudinal opening;
   a ball screw member positioned in the housing being comprised of a screw, a plurality of ball bearings, and surrounded in part by a nut, the screw being connected on one end thereof to the assembly for effecting rotation of the screw;
   the screw having helical grooves defining a spiral path in which the plurality of ball bearings travel between the screw and the nut as the screw is rotated in use by movement of the assembly, the ball bearings effecting linear motion of the nut along the length of the screw;
   a member extending through the opening in the housing and connecting the nut to the frame so that movement of the nut effects linear movement of the frame and the tool.

28. The assembly recited in claim 1 further comprising a perception sensor mounted to the carriage and connected for communication to a computer, the perception sensor being positioned for taking and communicating images of the work site to the computer for processing by the perception subsystem.

29. The assembly recited in claim 28 wherein the perception sensor is a three dimensional perception sensor selected from the group consisting of three dimensional perception cameras using stereo vision, laser scanning, laser time-of-flight, and combinations thereof.

30. The assembly recited in claim 28 wherein the perception subsystem calculates from the images communicated by the perception sensor the location of positions of interest on the work site for use of the end-effector of the tool actuation subassembly, and communicates the positions of interest to the motion planning subsystem, which calculates and communicates travel instructions comprised of one or more of the direction, extent and speed of travel of each of the gantry subassembly, carrier subassembly, and tool actuation subassembly on the first, second and third paths, respectively, to the motion control subsystem.

31. The assembly recited in claim 1 further comprising a remote controller connected for wireless communication to the autonomous control system for selecting one of manual or automatic control of one or more of the gantry, carrier and tool actuation subassemblies.

* * * * *